US012802231B2

(12) United States Patent
Liu et al.

(10) Patent No.: US 12,802,231 B2
(45) Date of Patent: Nov. 17, 2026

(54) TRAINING METHOD AND APPARATUS FOR IMAGE PROCESSING MODEL, ELECTRONIC DEVICE, COMPUTER PROGRAM PRODUCT, AND COMPUTER STORAGE MEDIUM

(71) Applicant: TENCENT TECHNOLOGY (SHENZHEN) COMPANY LIMITED, Shenzhen (CN)

(72) Inventors: Hong Liu, Shenzhen (CN); Dong Wei, Shenzhen (CN); Donghuan Lu, Shenzhen (CN); Liansheng Wang, Shenzhen (CN); Yefeng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 242 days.

(21) Appl. No.: 18/808,033

(22) Filed: Aug. 18, 2024

(65) Prior Publication Data

US 2024/0412374 A1 Dec. 12, 2024

Related U.S. Application Data

(63) Continuation of application No. PCT/CN2023/115191, filed on Aug. 28, 2023.

(30) Foreign Application Priority Data

Oct. 24, 2022 (CN) ......................... 202211304327.9

(51) Int. Cl.

*G06T 7/10* (2017.01)
*G06N 3/0455* (2023.01)
*G06N 3/084* (2023.01)

(52) U.S. Cl.

CPC ............. *G06T 7/10* (2017.01); *G06N 3/0455* (2023.01); *G06N 3/084* (2013.01); *G06T 2207/20081* (2013.01)

(58) Field of Classification Search

CPC ............. G06T 7/10; G06T 2207/20081; G06T 2207/10088; G06T 2207/20084;

(Continued)

(56) References Cited

U.S. PATENT DOCUMENTS

2019/0197366 A1 * 6/2019 Kecskemethy ........... G06T 7/11
2020/0311467 A1 10/2020 Srivastava et al.

(Continued)

FOREIGN PATENT DOCUMENTS

CN 113706558 A * 11/2021 ............. G06N 3/045
CN 114283151 A 4/2022

(Continued)

OTHER PUBLICATIONS

The World Intellectual Property Organization (WIPO) International Search Report for PCT/CN2023/115191 Oct. 19, 2023 7 Pages (including translation).

(Continued)

*Primary Examiner* — John B Strege
*Assistant Examiner* — Emily Rose Hauk
(74) *Attorney, Agent, or Firm* — ANOVA LAW GROUP, PLLC

(57) ABSTRACT

This application provides a training method and apparatus for an image processing model, an electronic device, and a storage medium. The method includes: obtaining a plurality of multimodal images used as training samples, types of the multimodal images including full-modality images and missing-modality images; invoking, based on each of the multimodal images, an initialized image processing model to execute a first training task for reconstructing the full- (Continued)

modality image, the image processing model outputting a first full-modality reconstructed image in a process of executing the first training task; performing image completion processing on each of first full-modality reconstructed images based on the full-modality image, to obtain a full-modality template image; determining a consistency loss between a multimodal image pair and the full-modality template image; and invoking, based on each of the multimodal images, a trained image processing model to execute a second training task for segmenting each of the multimodal images, and using the consistency loss as a constraint condition in the second training task.

20 Claims, 20 Drawing Sheets

(58) Field of Classification Search
CPC ............ G06T 2207/30096; G06T 7/11; G06N 3/0455; G06N 3/084; G06N 3/045; G06N 3/08; G06N 3/082
See application file for complete search history.

(56) References Cited

U.S. PATENT DOCUMENTS

2020/0327662 A1* 10/2020 Liu ...................... G06T 7/0012
2023/0245426 A1 8/2023 Lin

FOREIGN PATENT DOCUMENTS

CN 114911778 A 8/2022
CN 115115049 A 9/2022
CN 115170401 A 10/2022

OTHER PUBLICATIONS

Hong Liu et al., "M3AE: Multimodal Representation Learning for Brain Tumor Segmentation with Missing Modalities", arXiv: 2303.05302, Mar. 9, 2023 (Mar. 9, 2023), pp. 1-9.
Blum, Avrim Blum et al., "Combining labeled and unlabeled data with co-training." Proceedings of the eleventh annual conference on Computational learning theory. 1998: 92-100.
Reuben Dorent et al. "Hetero-modal variational encoder-decoder for joint modality completion and segmentation." International Conference on Medical Image Computing and Computer-Assisted Intervention. Springer, Cham, 2019:74-82.
Tongxue Zhou et al. "Latent correlation representation learning for brain tumor segmentation with missing MRI modalities." IEEE Trans. Image Process. 30 (2021): 4263-4274.
Tongxue Zhou et al. "Feature-enhanced generation and multimodality fusion based deep neural network for brain tumor segmentation with missing MR modalities." Neurocomputing 466 (2021): 102-112.
Yuhang Ding et al., "RFNet: Region-aware fusion network for incomplete multi-modal brain tumor segmentation." Proceedings of the IEEE/CVF international conference on computer vision. 2021: 3975-3984.
Yixin Wang et al. "ACN: adversarial co-training network for brain tumor segmentation with missing modalities." In: Proc. Int. Conf. MICCAI. pp. 400-420. Springer (2021).
Reza Azad et al., "SMU-Net: Style matching U-Net for brain tumor segmentation with missing modalities." arXiv preprint arXiv: 2204.02961. 2022.
Kaiming He et al. "Masked autoencoders are scalable vision learners." arXiv preprint arXiv: 2111. 06377 (2021).
Anh Nguyen et al. "Synthesizing the preferred inputs for neurons in neural networks via deep generator networks." Advances in neural information processing systems 29 (2016).
Minhao Hu et al. "Knowledge distillation from multi-modal to mono-modal segmentation networks." In: Proc. Int. Conf. MICCAI. pp. 772-781. Springer (2020).
Yixiao Ge et al. "Self-distillation with batch knowledge ensembling improves imagenet classification." arXiv preprint arXiv:2104.13298 (2021).
Adam Paszke et al. "Pytorch: An imperative style, high-performance deep learning library." Advances in neural information processing systems 32 (2019).
D. P. Kingma et al., "Adam : A Method for Stochastic Optimization." arXiv preprint arXiv: 1412. 6980 (2014).
Spyridon Bakas et al. "Identifying the best machine learning algorithms for brain tumor segmentation, progression assessment, and overall survival prediction in the BRATS challenge." arXiv preprint arXiv:1811.02629 (2018).
Z. Zhou et al. "Models Genesis." Medical image analysis. 2021, 67: 101840.
Aiham Taleb et al. "Multimodal self-supervised learning for medical image analysis." In: Proc. Int. Conf. IPMI. pp. 661-673. Springer (2021).
Andriy Myronenko. "3D MRI brain tumor segmentation using autoencoder regularization." In: Int. MICCAI Brainlesion Workshop. pp. 311-320. Springer (2018).

* cited by examiner

| | Baseline | Feature-1 | Feature-2 | Feature-3 | Feature-4 | Output |
|---|---|---|---|---|---|---|
| WT | 86.3 | 86.0 | 86.2 | 86.2 | 86.5 | 86.3 |
| TC | 80.8 | 79.8 | 80.5 | 80.0 | 81.1 | 80.3 |
| ET | 58.2 | 57.0 | 58.0 | 56.6 | 59.1 | 53.5 |

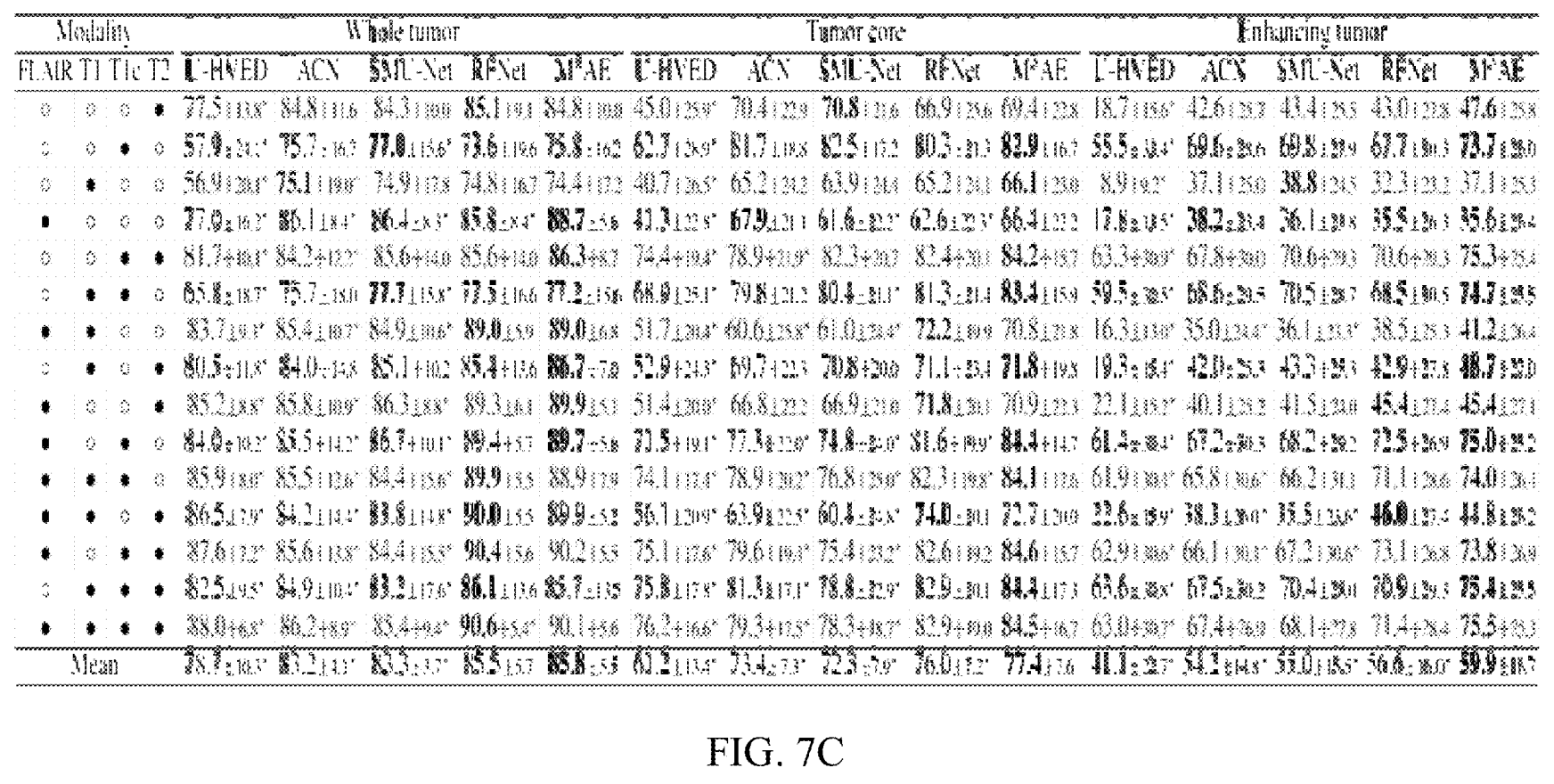

| Modality | | | | Whole tumor | | | | | Tumor core | | | | | Enhancing tumor | | | | |
|---|---|---|---|---|---|---|---|---|---|---|---|---|---|---|---|---|---|---|
| FLAIR | T1 | T1c | T2 | U-HVED | ACN | SMU-Net | RFNet | M³AE | U-HVED | ACN | SMU-Net | RFNet | M³AE | U-HVED | ACN | SMU-Net | RFNet | M³AE |
| ○ | ○ | ○ | ● | 77.5 | 84.8 | 84.3 | 85.1 | 84.8 | 45.0 | 70.4 | 70.8 | 66.9 | 69.4 | 18.7 | 42.6 | 43.4 | 43.0 | 47.6 |
| ○ | ○ | ● | ○ | 57.9 | 75.7 | 77.0 | 73.6 | 75.8 | 62.7 | 81.7 | 82.5 | 80.3 | 82.9 | 55.5 | 69.6 | 69.8 | 67.7 | 73.7 |
| ○ | ● | ○ | ○ | 56.9 | 75.1 | 74.9 | 74.8 | 74.4 | 40.7 | 65.2 | 63.9 | 65.2 | 66.1 | 8.9 | 37.1 | 38.8 | 32.3 | 37.1 |
| ● | ○ | ○ | ○ | 77.0 | 86.1 | 86.4 | 85.8 | 88.7 | 41.3 | 67.9 | 61.6 | 62.6 | 66.4 | 17.8 | 38.2 | 36.1 | 35.5 | 35.6 |
| ○ | ○ | ● | ● | 81.7 | 84.2 | 85.6 | 85.6 | 86.3 | 74.4 | 78.9 | 82.3 | 82.4 | 84.2 | 63.3 | 67.8 | 70.6 | 70.6 | 75.3 |
| ○ | ● | ● | ○ | 65.8 | 75.7 | 77.7 | 77.5 | 77.2 | 68.9 | 79.8 | 80.4 | 81.3 | 83.4 | 59.5 | 68.6 | 70.5 | 68.5 | 74.7 |
| ● | ● | ○ | ○ | 83.7 | 85.4 | 84.9 | 89.0 | 89.0 | 51.7 | 60.6 | 61.0 | 72.2 | 70.8 | 16.3 | 35.0 | 36.1 | 38.5 | 41.2 |
| ○ | ● | ○ | ● | 80.5 | 84.0 | 85.1 | 85.4 | 86.7 | 52.9 | 69.7 | 70.8 | 71.1 | 71.8 | 19.3 | 42.0 | 43.3 | 42.9 | 48.7 |
| ● | ○ | ○ | ● | 85.2 | 85.8 | 86.3 | 89.3 | 89.9 | 51.4 | 66.8 | 66.9 | 71.8 | 70.9 | 22.1 | 40.1 | 41.5 | 45.4 | 45.4 |
| ● | ○ | ● | ○ | 84.0 | 85.5 | 86.7 | 89.4 | 89.7 | 71.5 | 77.3 | 74.8 | 81.6 | 84.4 | 61.4 | 67.2 | 68.2 | 72.5 | 75.0 |
| ● | ● | ● | ○ | 85.9 | 85.5 | 84.4 | 89.9 | 88.9 | 74.1 | 78.9 | 76.8 | 82.3 | 84.1 | 61.9 | 65.8 | 66.2 | 71.1 | 74.0 |
| ● | ● | ○ | ● | 86.5 | 84.2 | 83.8 | 90.0 | 89.9 | 56.1 | 63.9 | 60.4 | 74.0 | 72.7 | 22.6 | 38.3 | 35.5 | 46.0 | 44.8 |
| ● | ○ | ● | ● | 87.6 | 85.6 | 84.4 | 90.4 | 90.2 | 75.1 | 79.6 | 75.4 | 82.6 | 84.6 | 62.9 | 66.1 | 67.2 | 73.1 | 73.8 |
| ○ | ● | ● | ● | 82.5 | 84.9 | 83.2 | 86.1 | 85.7 | 75.8 | 81.3 | 78.8 | 82.9 | 84.4 | 63.6 | 67.5 | 70.4 | 70.9 | 75.4 |
| ● | ● | ● | ● | 88.0 | 86.2 | 85.4 | 90.6 | 90.1 | 76.2 | 79.3 | 78.3 | 82.9 | 84.5 | 63.0 | 67.4 | 68.1 | 71.4 | 75.5 |
| Mean | | | | 78.7 | 83.2 | 83.3 | 85.5 | 85.8 | 61.2 | 73.4 | 72.3 | 76.0 | 77.4 | 41.1 | 54.2 | 55.0 | 56.6 | 59.9 |

FIG. 7C

| Method | DSC (%) ↑ | | | HD95 (mm) ↓ | | |
|---|---|---|---|---|---|---|
| | Whole | Core | Enhancing | Whole | Core | Enhancing |
| U-HVED† | $88.2_{\pm7.8^{*}}$ | $76.5_{\pm23.6^{*}}$ | $70.9_{\pm27.6}$ | $5.2_{\pm4.3^{*}}$ | $10.5_{\pm14.5^{*}}$ | $6.7_{\pm15.1}$ |
| ACN† | $89.9_{\pm5.9^{*}}$ | $83.3_{\pm18.1^{*}}$ | $77.9_{\pm24.5}$ | $6.5_{\pm6.8^{*}}$ | $9.4_{\pm17.6^{*}}$ | $4.5_{\pm12.6}$ |
| SMU-Net† | $90.1_{\pm7.3}$ | $82.3_{\pm19.9^{*}}$ | $79.2_{\pm21.5}$ | $6.8_{\pm13.1}$ | $9.5_{\pm18.3}$ | $6.2_{\pm15.0^{*}}$ |
| RFNet† | $90.1_{\pm6.2^{*}}$ | $84.6_{\pm17.1}$ | $77.2_{\pm24.0^{*}}$ | $4.8_{\pm5.9^{*}}$ | $\mathbf{6.9}_{\pm13.1}$ | $5.3_{\pm13.0^{*}}$ |
| ModGen† | $90.2_{\pm6.0}$ | $82.5_{\pm19.9^{*}}$ | $77.0_{\pm24.4^{*}}$ | $5.6_{\pm8.8}$ | $8.3_{\pm14.7}$ | $4.2_{\pm8.6}$ |
| CMJP‡ | 89.7 | 84.5 | 79.7 | NA | NA | NA |
| $M^3AE$ | $\mathbf{90.5}_{\pm4.8}$ | $\mathbf{86.1}_{\pm13.5}$ | $\mathbf{81.0}_{\pm20.5}$ | $\mathbf{4.6}_{\pm5.9}$ | $\mathbf{6.9}_{\pm13.5}$ | $\mathbf{2.6}_{\pm3.2}$ |
| Challenge‡ | 90.4 | 86.0 | 81.5 | 4.5 | 8.3 | 3.8 |

FIG. 7D

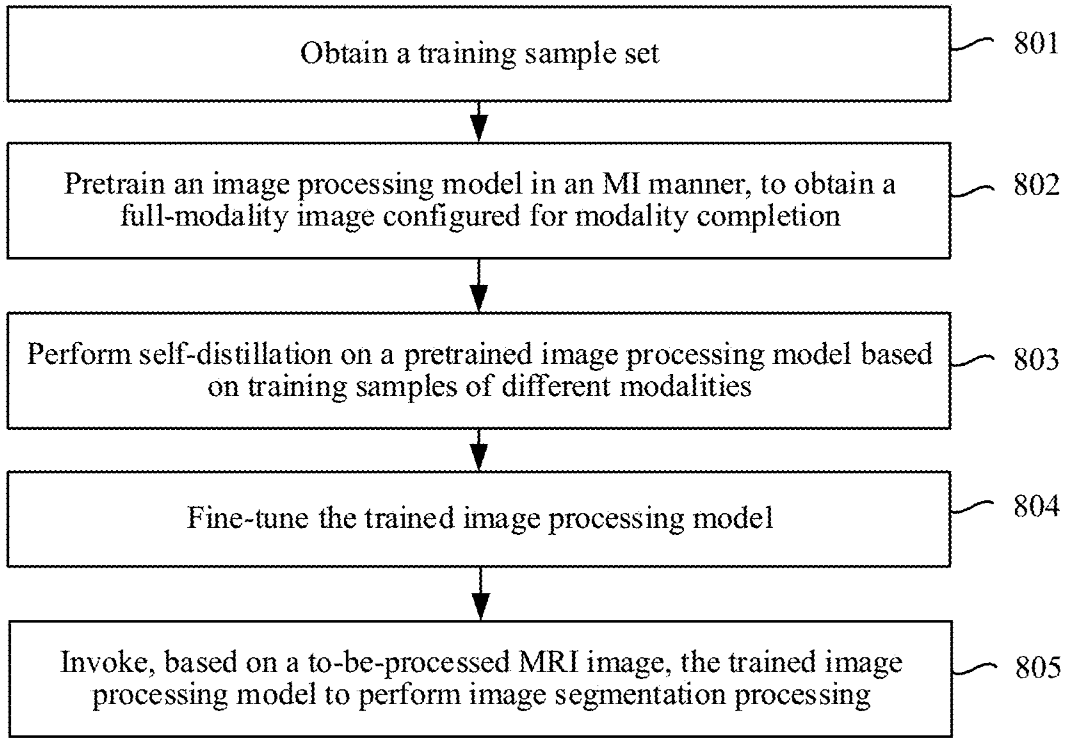

FIG. 8

TRAINING METHOD AND APPARATUS FOR IMAGE PROCESSING MODEL, ELECTRONIC DEVICE, COMPUTER PROGRAM PRODUCT, AND COMPUTER STORAGE MEDIUM

CROSS-REFERENCE TO RELATED APPLICATIONS

This application is a continuation of International Application No. PCT/CN2023/115191, filed on Aug. 28, 2023, which claims priority to Chinese Patent Application No. 202211304327.9 filed on Oct. 24, 2022, the entire contents of both of which are incorporated herein by reference.

FIELD OF THE TECHNOLOGY

This application relates to artificial intelligence technologies, and in particular, to a training method and apparatus for an image processing model, an electronic device, a computer program product, and a computer storage medium.

BACKGROUND OF THE DISCLOSURE

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. Computer vision (CV) is a science that studies how to use a machine to "see," and furthermore, that uses a camera and a computer to replace human eyes to perform machine vision such as recognition, positioning, and measurement on a target, and further perform graphic processing, so that the computer processes the target into an image more suitable for human eyes to observe, or an image transmitted to an instrument for detection.

Types of multimodal images include RGB images, infrared, near-infrared, and other multispectral images, depth maps, and various medical images. The medical images are, for example, magnetic resonance imaging (MRI) images. A group of MRI images are captured for the same human body part. Images of each modality represent imaging conditions of different positions of the part. Multimodal tasks are mainly divided into two categories: restoration and enhancement. Multimodal image restoration tasks are generally restoration tasks such as denoising and deblurring a modality A under guidance of a modality B. Multimodal image enhancement is to merge effective information of various modalities, to generate an image with better quality than original modalities.

It is assumed that there is a missing part in a group of multimodal images. For example, an image block of an image corresponding to a modality is missing, or a modality is missing. In the related art, to segment an abnormal region of a multimodal image with a missing modality, complex model designs are usually involved, so that processing procedures are complicated, more parameters and calculations are needed for training and deployment, and accuracy of segmenting the multimodal image is reduced.

In the related art, there is currently no good solution for image processing of multimodal images with a missing modality.

SUMMARY

In consistent with the disclosure, there is provided a training method including obtaining a plurality of multimodal images including a full-modality image and a missing-modality image and each including a plurality of images of different modalities, invoking, based on each of the multimodal images, an initialized image processing model to execute a first training task for reconstructing the full-modality image, during which the image processing model outputs a plurality of full-modality reconstructed images each corresponding to one of the multimodal images, performing image completion processing on each of the full-modality reconstructed images based on the full-modality image to obtain a full-modality template image, determining a consistency loss between the full-modality template image and a multimodal image pair including any two of the multimodal images, and invoking, based on each of the multimodal images, a trained image processing model to execute a second training task for segmenting each of the multimodal images. The consistency loss is used as a constraint condition of updating a parameter of the image processing model in the second training task.

Also in consistent with the disclosure, there is provided an electronic device including one or more memories storing one or more computer-executable instructions, and one or more processors configured to execute the one or more computer-executable instructions to obtain a plurality of multimodal images including a full-modality image and a missing-modality image and each including a plurality of images of different modalities, invoke, based on each of the multimodal images, an initialized image processing model to execute a first training task for reconstructing the full-modality image, during which the image processing model outputs a plurality of full-modality reconstructed images each corresponding to one of the multimodal images, perform image completion processing on each of the full-modality reconstructed images based on the full-modality image to obtain a full-modality template image, determine a consistency loss between the full-modality template image and a multimodal image pair including any two of the multimodal images, and invoke, based on each of the multimodal images, a trained image processing model to execute a second training task for segmenting each of the multimodal images. The consistency loss is used as a constraint condition of updating a parameter of the image processing model in the second training task.

Also in consistent with the disclosure, there is provided non-transitory computer-readable storage medium storing one or more computer-executable instructions that, when executed by one or more processors, cause the one or more processors to obtain a plurality of multimodal images including a full-modality image and a missing-modality image and each including a plurality of images of different modalities, invoke, based on each of the multimodal images, an initialized image processing model to execute a first training task for reconstructing the full-modality image, during which the image processing model outputs a plurality of full-modality reconstructed images each corresponding to one of the multimodal images, perform image completion processing on each of the full-modality reconstructed images based on the full-modality image to obtain a full-modality template image, determine a consistency loss between the full-modality template image and a multimodal image pair including any two of the multimodal images, and invoke, based on each of the multimodal images, a trained image processing model to execute a second training task for segmenting each of the multimodal images. The consistency loss is used as a constraint condition of updating a parameter of the image processing model in the second training task.

BRIEF DESCRIPTION OF THE DRAWINGS

FIG. 7C and FIG. 7D show comparison result tables according to an embodiment of this application.

FIG. 8 is a schematic flowchart of a training method for an image processing model according to an embodiment of this application.

DESCRIPTION OF EMBODIMENTS

Figure 1:
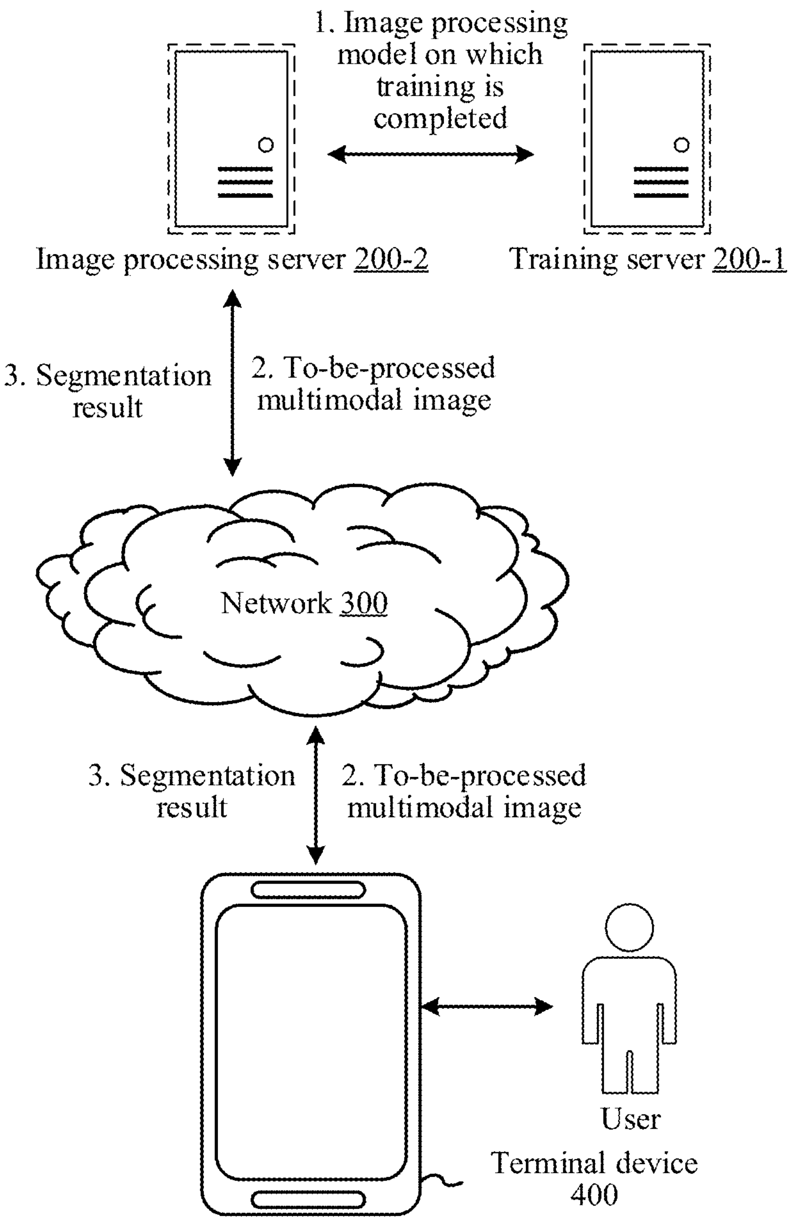
FIG. 1 is a schematic diagram showing an application mode of a training method for an image processing model according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, the "some embodiments" may be the same subset or different subsets of all the possible embodiments, and may be combined with each other without conflict.

In the following descriptions, the term "first/second/third" is merely intended to distinguish between similar objects but does not necessarily indicate a specific order of an object. The "first/second/third" is interchangeable in terms of a specific order or sequence if permitted, so that the embodiments of this application described herein can be implemented in a sequence in addition to the sequence shown or described herein.

In the embodiments of this application, related data such as user information and user feedback data are involved. When the embodiments of this application are applied to specific products or technologies, user permission or consent needs to be obtained, and the collection, use, and processing of related data need to comply with relevant laws, regulations, and standards of relevant countries and regions.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

(1) Image segmentation: Image segmentation is a key process in computer vision, which includes segmenting visual input into segments to simplify image analysis. The segment represents a target or a part of the target, and is formed by a pixel set or "super pixels." Image segmentation organizes pixels into larger parts, eliminating a need for individual pixels as units of observation. Image segmentation is performed to identify parts of an image and understanding what objects the parts belong to, which is a basis for target detection and classification. Image segmentation can be applied in the fields such as face detection, medical imaging, and autonomous driving.

(2) Magnetic resonance imaging (MRI) image: It is an image obtained by using an MRI technology. MRI is a relatively new medical imaging technology that uses static magnetic fields and radio frequency magnetic fields to image human tissues. In an imaging process, high-contrast and clear images can be obtained without electron ionizing radiation or contrast agents. MRI can reflect human organ disorders and early lesions from the inside of molecular cells of human organs. A set of MRI images generally includes images of multiple modalities, and images of different modalities can highlight different lesion areas.

(3) Missing modality: In clinical application, a set of MRI images includes subimages of multiple modalities. Due to image corruption, artifacts, acquisition protocols, patient allergies to contrast agents, cost, or the like, one or more modalities are generally missing in the MRI images. For example: a set of full-modality MRI images includes images of four modalities. In an actual acquisition process, only subimages of three modalities are obtained, and modalities are missing in the acquired MRI images.

(4) Masked autoencoder (MAE): As an image self-supervision framework, the MAE has achieved great success in the field of self-supervision. An agent task of the MAE is to guide a model to restore an original pixel value of an image according to a visible partial blocks (image blocks) in the image.

(5) Model inversion (MI): MI has been long used in the field of deep learning interpretability. A goal of this technology is to synthesize some most representative images predicted through a network, for example, saliency maps for classification.

(6) Supervised learning: Training data with both features and identification labels is trained, so that a machine learns a relationship generated between the features and the labels. After training, labels with only feature data can be predicted.

(7) Knowledge distillation: Knowledge distillation is to build a lightweight small model, and train the small model by using supervision information of a large model with better performance, so that the small model can achieve better performance and precision. The larger model is referred to as a teacher model, and the small model is referred to as a student model. Supervision information outputted by the teacher model is referred to as knowledge, and a process that the student model learns and transfers the supervision information from the teacher model is referred to as distillation.

(8) Self-distillation (SD): SD is to perform knowledge distillation by using supervised learning. Compared with an original knowledge distillation method, in a process of SD, the teacher model and the student model are a same model, namely, the model guides itself to learn, to complete knowledge distillation.

(9) Co-training: Co-training is a type of semi-supervised learning method based on "divergence," which is initially designed for "multi-view" data. In a multi-modal scene to which the embodiments of this application are applied, co-training is to jointly train a full-modality data model and a missing-modality data model, and transfer knowledge between corresponding models by using content consistency between different modality combinations.

The embodiments of this application provide a training method for an image processing model, a training apparatus for an image processing model, an electronic device, a computer-readable storage medium, and a computer program product, which can improve accuracy of segmentation of multimodal images.

An exemplary application of the electronic device provided in the embodiments of this application is described below. The electronic device provided in the embodiments of this application may be implemented as various types of user terminals such as a notebook computer, a tablet computer, a desktop computer, a set-top box, a mobile device (for example, a mobile phone, a portable music player, a personal digital assistant, a dedicated messaging device, or a portable game device), or an in-vehicle terminal, or may be implemented as a server. An exemplary application when the device is implemented as a server is described below.

FIG. 1 is a schematic diagram showing an application mode of a training method for an image processing model according to an embodiment of this application. For example, a training server 200-1, an image processing server 200-2, a network 300, and a terminal device 400 are involved in FIG. 1. The training server 200-1 communicates with the image processing server 200-2 through the network 300, or in other manners. The terminal device 400 is connected to the image processing server 200-2 through the network 300. The network 300 may be a wide area network or a local area network, or may be a combination thereof.

For example, a user is a scientific researcher or medical staff, and a to-be-processed multimodal image (also referred to as a "target multimodal image") may be an MRI image of a human body. A set of MRI images includes subimages of multiple modalities, a segmentation result is a region with an abnormality in the multimodal image, and an image processing server 200 is a server configured to segment the region with an abnormality (for example, a tumor) in the MRI images. The user can determine a problem such as a lesion in the human body based on the segmentation result. This is described below with reference to the above example.

The training server 200-1 obtains a full-modality image and a plurality of missing-modality images as training samples, trains an initialized image processing model (i.e., an image processing model that has been initialized) based on the training samples by using the training method for an image processing model provided in the embodiments of this application, to obtain an image processing model on which training is completed, and synchronizes the image processing model on which training is completed into the image processing server 200-2. The image processing model on which training is completed is configured to perform segmentation processing on MRI images.

In response to receiving the to-be-processed multimodal image sent by the terminal device 400, the image processing server 200-2 invokes, based on the to-be-processed multimodal image, the image processing model to perform segmentation processing, to obtain a segmentation result. The image processing server 200-2 sends the segmentation result to the terminal device 400 through the network 300. The terminal device 400 displays the segmentation result to the user, and the use may use the segmentation result as a basis for diagnosis.

In some embodiments, the training method for an image processing model in the embodiments of this application may be further applied to different training processes of an image processing model and different application scenarios, which is described below in detail.

(1) Medical image processing. For example, the training samples include: MRI images of human organs with lesions and MRI images of healthy human organs. The MRI images include subimages of multiple modalities. An image processing model on which training is completed is configured to segment an MRI image of a human organ, and a segmentation result is a region with a lesion in the human organ. Medical personnel may use the segmentation result as a basis for diagnosis.

(2) Industrial detection. For example, the training samples include: computed tomography (CT) images of defective opaque objects (such as industrial materials or parts) and CT images of objects with quality meeting standards. The CT images include subimages of multiple modalities. An image processing model on which training is completed is configured to detect a defective region (such as a pore, an inclusion, a pinhole, a shrinkage cavity, delamination) in the opaque object. A technician determines the defect of the object based on a segmentation result, improving efficiency of quality control.

(3) Face detection. For example, the training samples include video sequences including faces. Each frame of image in the video sequence corresponds to a modality, and annotation data is a face region in each frame of image in the video sequence. An image processing model on which training is completed is configured to segment the face region in the image, and the image processing model on which training is completed may be configured to provide a face recognition service.

(4) Self-driving. For example, the training samples include video sequences including streets. Each frame of image in the video sequence corresponds to a modality, and annotation data is a region in which an obstacle (for example, a vehicle, a roadblock, or a guardrail) is located in each frame of image in the video sequence. An image processing model on which training is completed is configured to segment images acquired by a camera of a self-driving vehicle in real time, to obtain obstacle regions in the images, so that the self-driving vehicle determines a safe driving region based on the obstacle regions.

The embodiments of this application may be implemented by using a blockchain technology, the trained image processing model in the embodiments of this application may be uploaded to a blockchain for storage and reliability of the image processing model is ensured by using a consensus algorithm. A blockchain is a new application mode of computer technologies such as distributed data storage, point-to-point transmission, a consensus mechanism, and an encryption algorithm. The blockchain is essentially a decentralized database, and is a string of data blocks generated through association by using a cryptographic method. Each data block includes a batch of information, for verifying validity (anti-counterfeiting) of information of the data block and generating a next data block. The blockchain may include a blockchain underlying platform, a platform product service layer, and an application service layer.

The embodiments of this application may be implemented by using database technology. A database may be considered as an electronic file cabinet, that is, a place for storing an electronic file. A user may perform an operation such as adding, querying, updating, or deleting data in the file. The so-called "database" is a data set that is stored together in a specific manner, can be shared by a plurality of users, has as little redundancy as possible, and is independent of an application program.

A database management system (DBMS) is a computer software system designed for managing databases, which generally has basic functions such as storage, interception, security, and backup. The DBMS may be classified according to database models that the DBMS supports, such as a relation and an extensible markup language (XML); or according to types of computers that the DBMS supports, such as a server cluster and a mobile phone; or according to a used query language, such as a structured query language (SQL) and XQuery; or according to a focus of performance impulse, such as maximum scale and a maximum running speed; or in other classification manners. Regardless of the classification manner used, some DBMSs can span categories, for example, supporting multiple query languages simultaneously.

The embodiments of this application may alternatively be implemented through cloud technology. The cloud technology is a collective name of a network technology, an information technology, an integration technology, a management platform technology, an application technology, and the like based on application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. With high development and application of the Internet industry, and promotion of demands such as search services, social network, mobile business, open cooperation, each article may have its own Hash code identifier in the future, and needs to be transmitted to a background system for logical processing. Data at different levels is separately processed, and data in various industries requires strong system support, which can only be implemented through cloud computing.

In some embodiments, the training server 200-1 and the image processing server 200-2 may be integrated into an independent physical server.

In some embodiments, the training server 200-1 or the image processing server 200-2 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a CDN, big data, and an artificial intelligence platform. The electronic device may be a smartphone, a tablet computer, a notebook computer, a desktop computer, a smart speaker, a smartwatch, or the like, but is not limited thereto. The terminal device and the server may be directly or indirectly connected in a wired or wireless communication manner. This is not limited in the embodiments of the present disclosure.

Figure 2A:
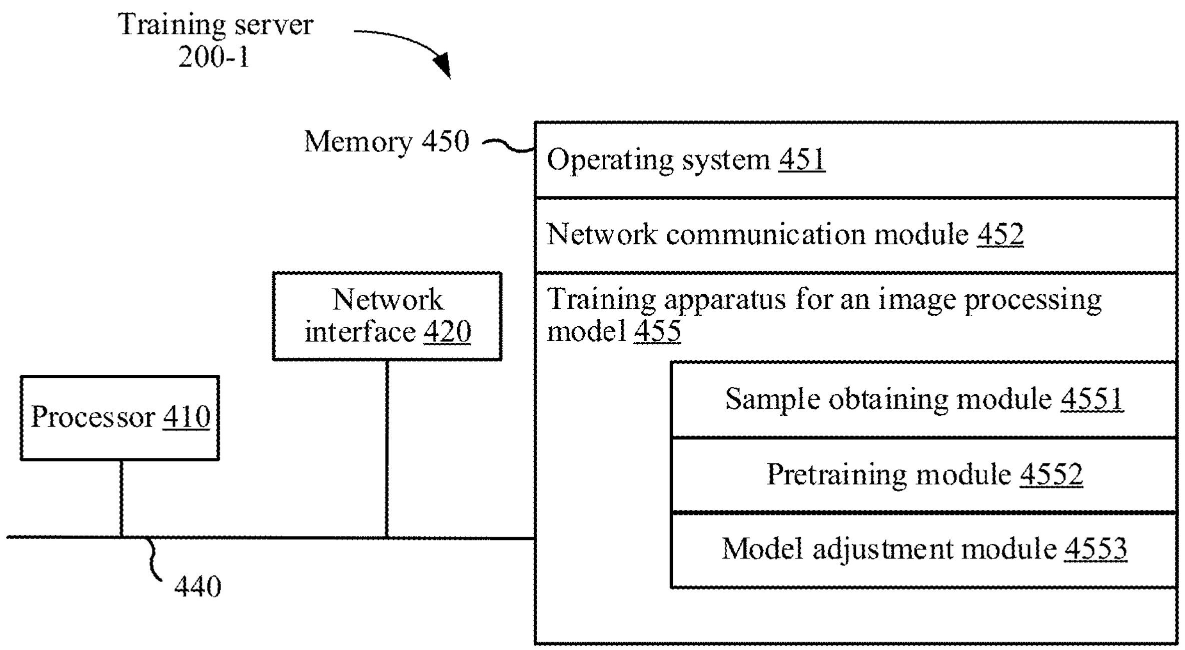
FIG. 2A is a schematic structural diagram of a server according to an embodiment of this application.

FIG. 2A is a schematic structural diagram of a server according to an embodiment of this application. The training server 200-1 shown in FIG. 2A includes: at least one processor 410, a memory 450, and at least one network interface 420. Components in the training server 200-1 are coupled together by using a bus system 440. The bus system 440 is configured to implement connection and communication between the components. In addition to a data bus, the bus system 440 further includes a power bus, a control bus, and a state signal bus. However, for clear description, various types of buses in FIG. 2A are marked as the bus system 440.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The memory 450 may be a removable memory, a non-removable memory, or a combination thereof. Exemplary hardware devices include a solid-state memory, a hard disk drive, an optical disc driver, or the like. In some embodiments, the memory 450 includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 can store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another electronic device through one or more (wired or wireless) network interfaces 420. Exemplary network interfaces 420 include: Bluetooth, wireless compatible authentication (Wi-Fi), a universal serial bus (USB), and the like.

In some embodiments, a training apparatus for an image processing model provided in the embodiments of this application may be implemented in a software manner. FIG. 2A shows a training apparatus 455 for an image processing model stored in the memory 450, which may be software in a form of a program and a plug-in, including the following software modules: a sample obtaining module 4551, a pretraining module 4552, and a model adjustment module 4553. These modules are logical, and can be combined or further split according to functions implemented. The following describes functions of the modules.

Figure 2B:
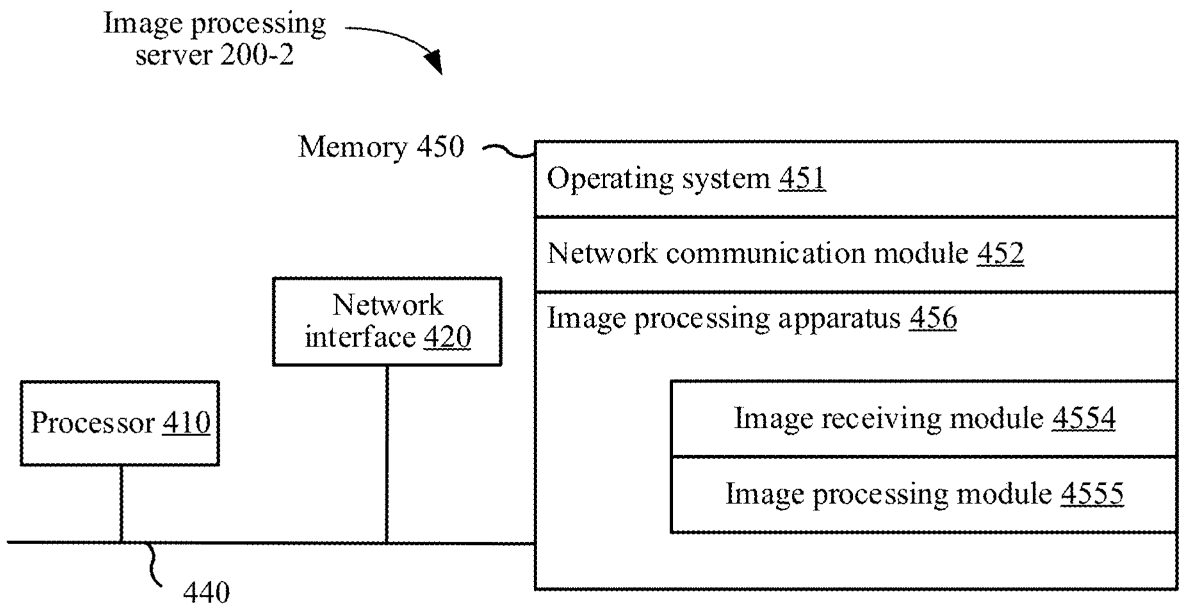
FIG. 2B is a schematic structural diagram of a server according to an embodiment of this application.

FIG. 2B is a schematic structural diagram of a server according to an embodiment of this application. The image processing server 200-2 shown in FIG. 2B includes: at least one processor 410, a memory 450, and at least one network interface 420. Components in the image processing server 200-2 are coupled together by using a bus system 440. The bus system 440 is configured to implement connection and communication between the components. In addition to a data bus, the bus system 440 further includes a power bus, a control bus, and a state signal bus. However, for clear description, various types of buses in FIG. 2B are marked as the bus system 440.

The processor 410 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The memory 450 may be a removable memory, a non-removable memory, or a combination thereof. Exemplary hardware devices include a solid-state memory, a hard disk drive, an optical disc driver, or the like. In some embodiments, the memory 450 includes one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of this application is to include any other suitable type of memories.

In some embodiments, the memory 450 can store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another electronic device through one or more (wired or wireless) network interfaces 420. Exemplary network interfaces 420 include: Bluetooth, wireless compatible authentication (Wi-Fi), a universal serial bus (USB), and the like.

In some embodiments, a training apparatus for an image processing model provided in the embodiments of this application may be implemented in a software manner. FIG. 2B shows a training apparatus 456 stored in the memory 450, which may be software in a form of a program and a plug-in, including the following software modules: an image receiving module 4554 and an image processing module 4555. These modules are logical, and can be combined or further split according to functions implemented. The following describes functions of the modules.

Figure 3A:
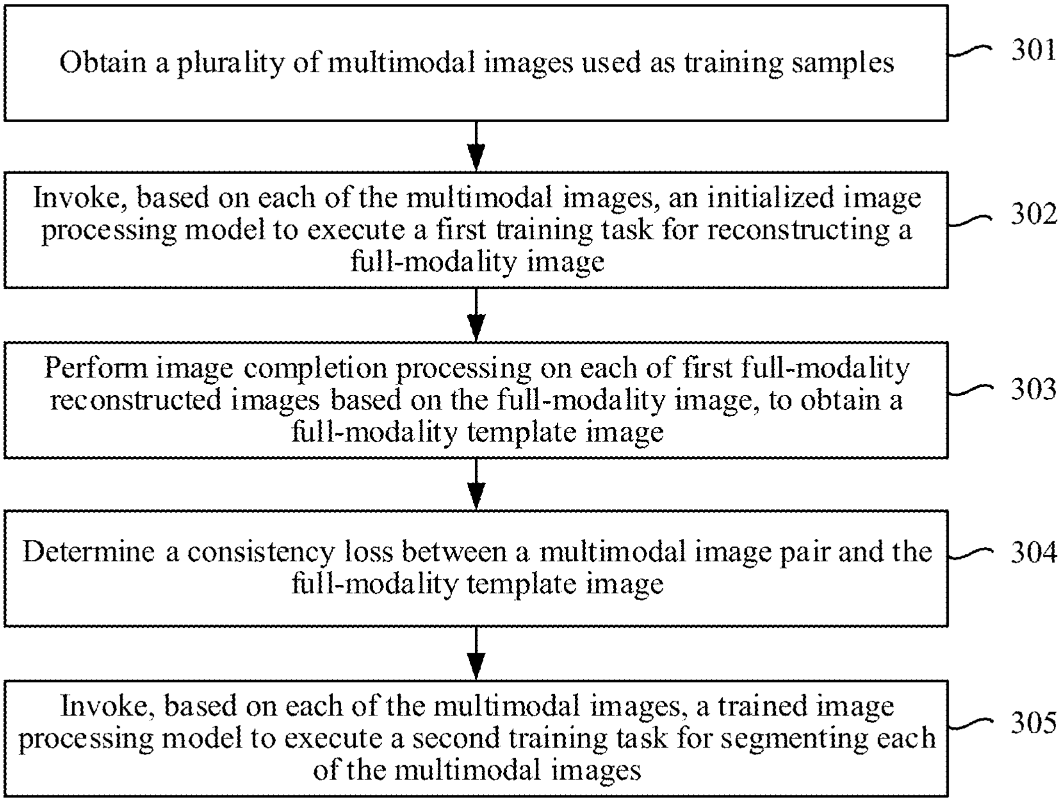
FIG. 3A to FIG. 3K are schematic flowcharts of a training method for an image processing model according to an embodiment of this application.

A training method for an image processing model provided in the embodiments of this application is described with reference to exemplary application and implementation of the server provided in the embodiments of this application. FIG. 3A is a schematic flowchart of a training method for an image processing model according to an embodiment of this application. The method is described using the server (training server) in FIG. 1 as an execution entity with reference to operations shown in FIG. 3A.

Operation 301. Obtain a plurality of multimodal images used as training samples.

For example, types of multimodal images include full-modality images and missing-modality images. A plurality of multimodal images are used as the training samples.

In this embodiment of this application, an example in which the multimodal image is an MRI image of a human organ is used for description. A set of MRI images includes subimages of multiple modalities. In practical acquisition process, subimages of a part of modalities of the MRI image or image blocks of a part of subimages may be lost, forming a missing-modality image. An image processing model is configured to segment a specific region in the MRI image. The specific region is, for example, a region with a lesion in the organ and a contour line of the organ.

For example, obtaining the multimodal image may be implemented in the following manner: performing random masking on image blocks in a full-modality image. Performing masking on image blocks may be implemented through image processing software (Photoshop, PS).

Figure 3B:
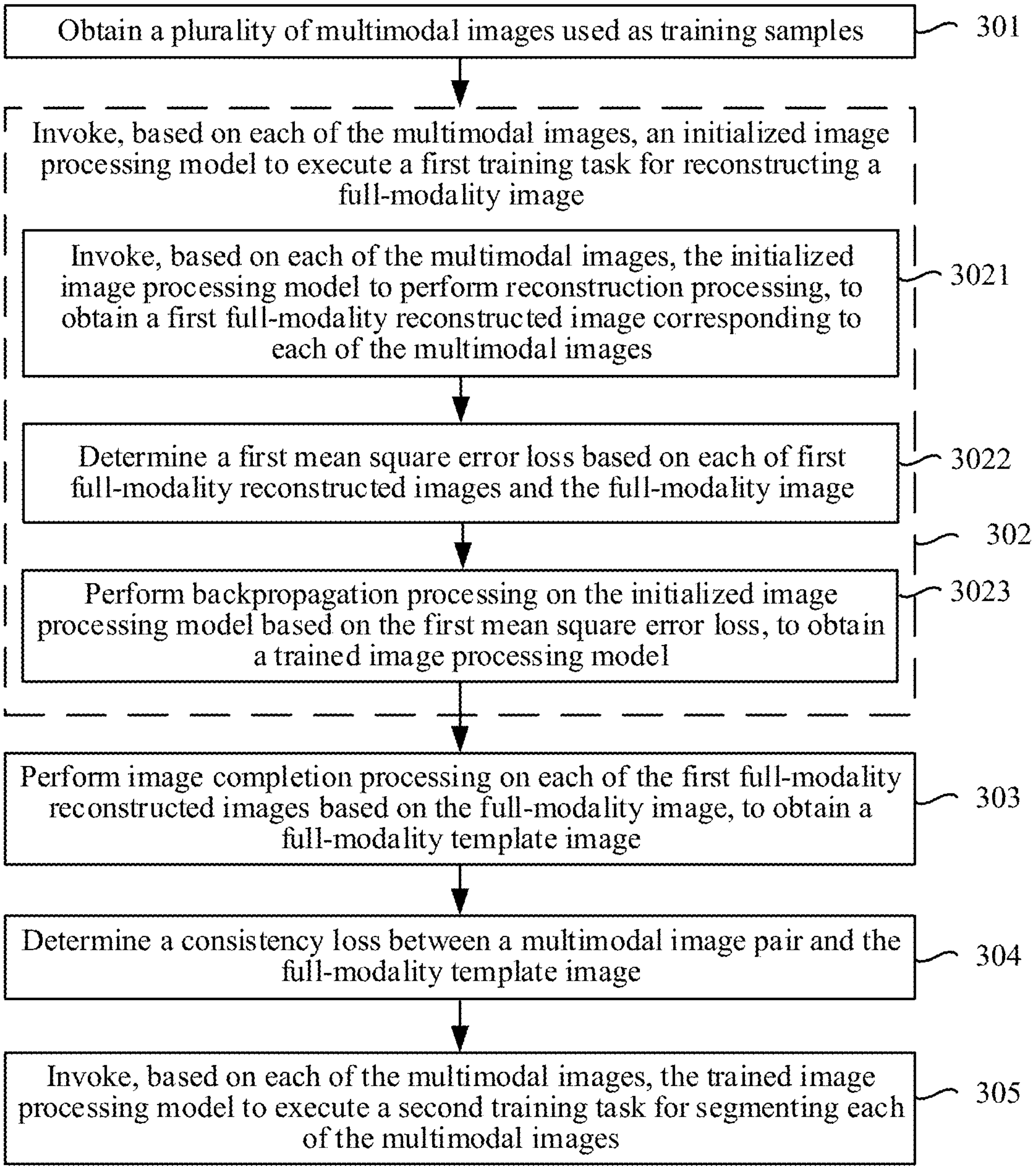
Figure 3C:
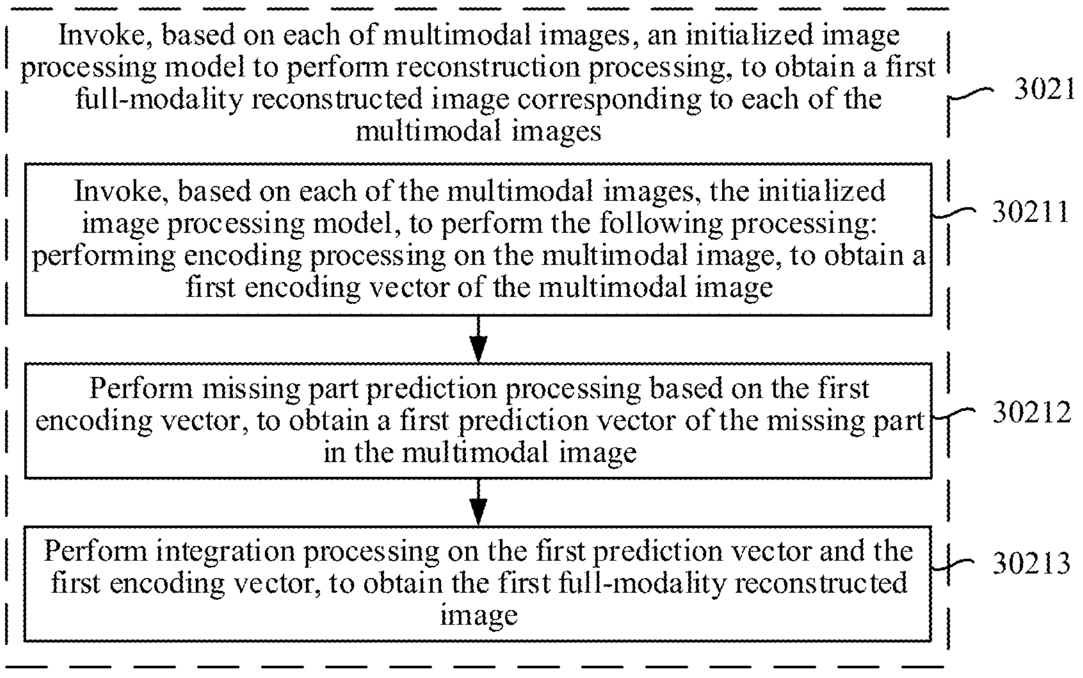
Figure 3D:
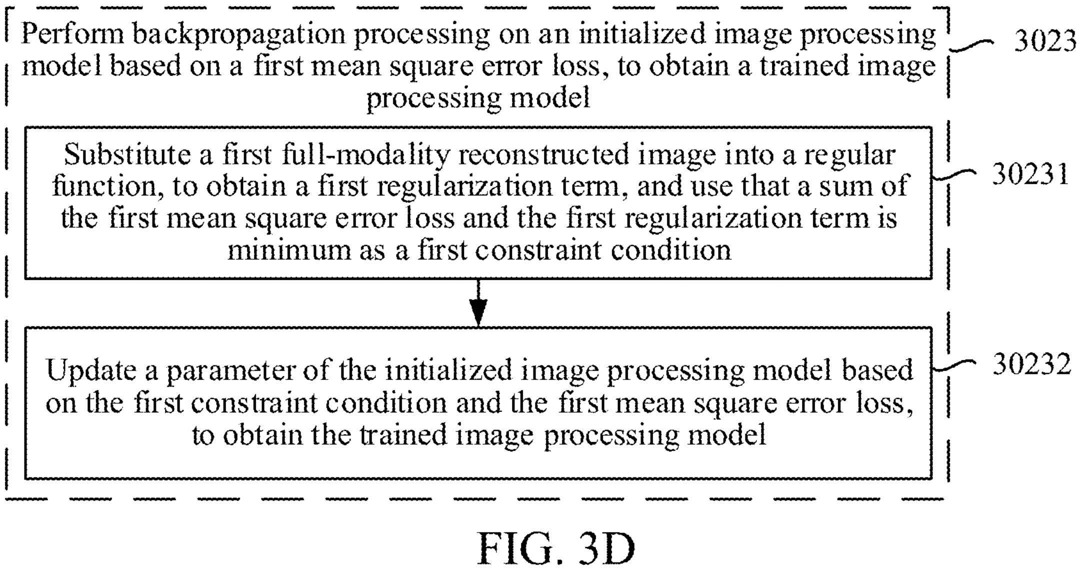
Figure 3E:
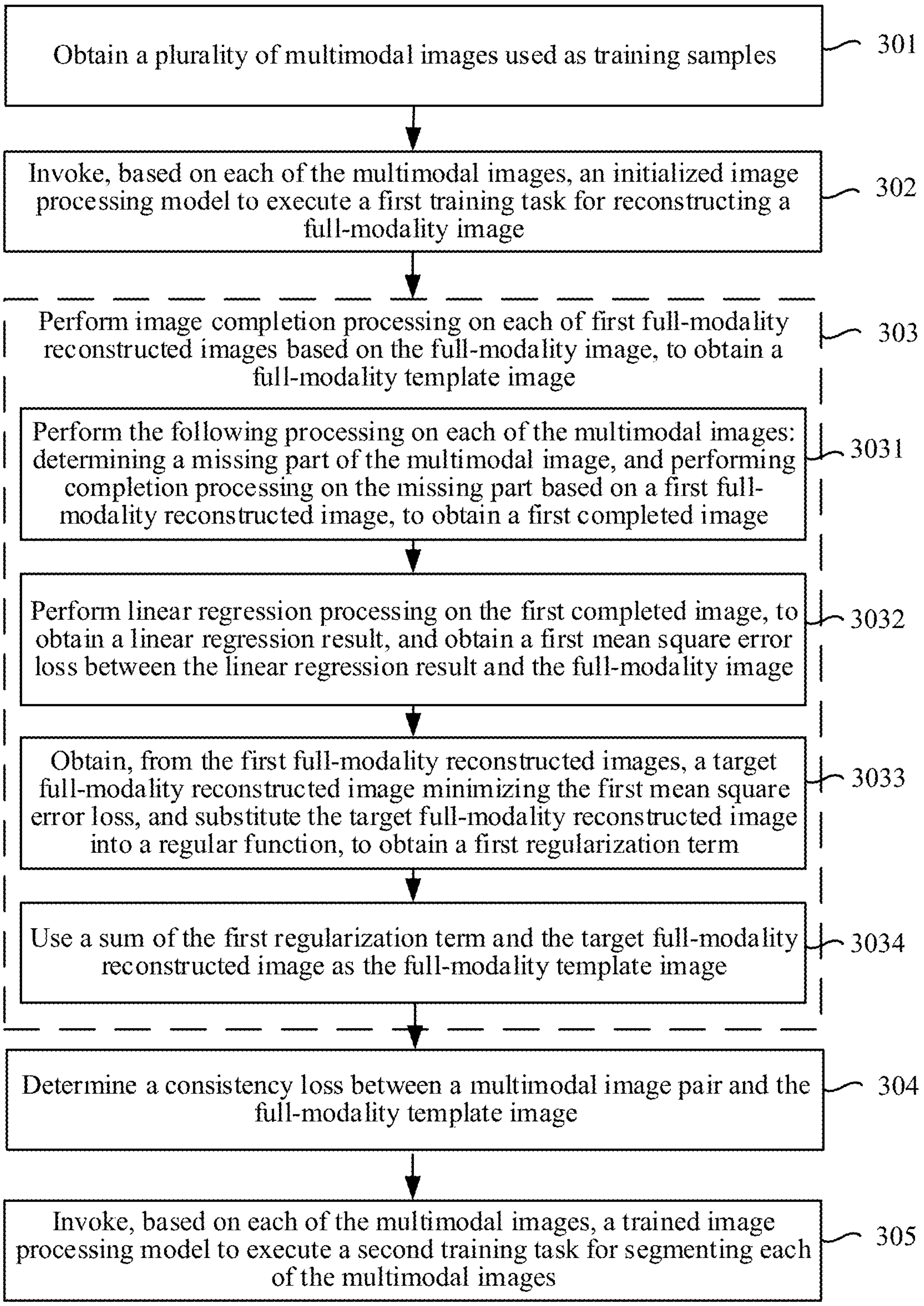
Figure 3F:
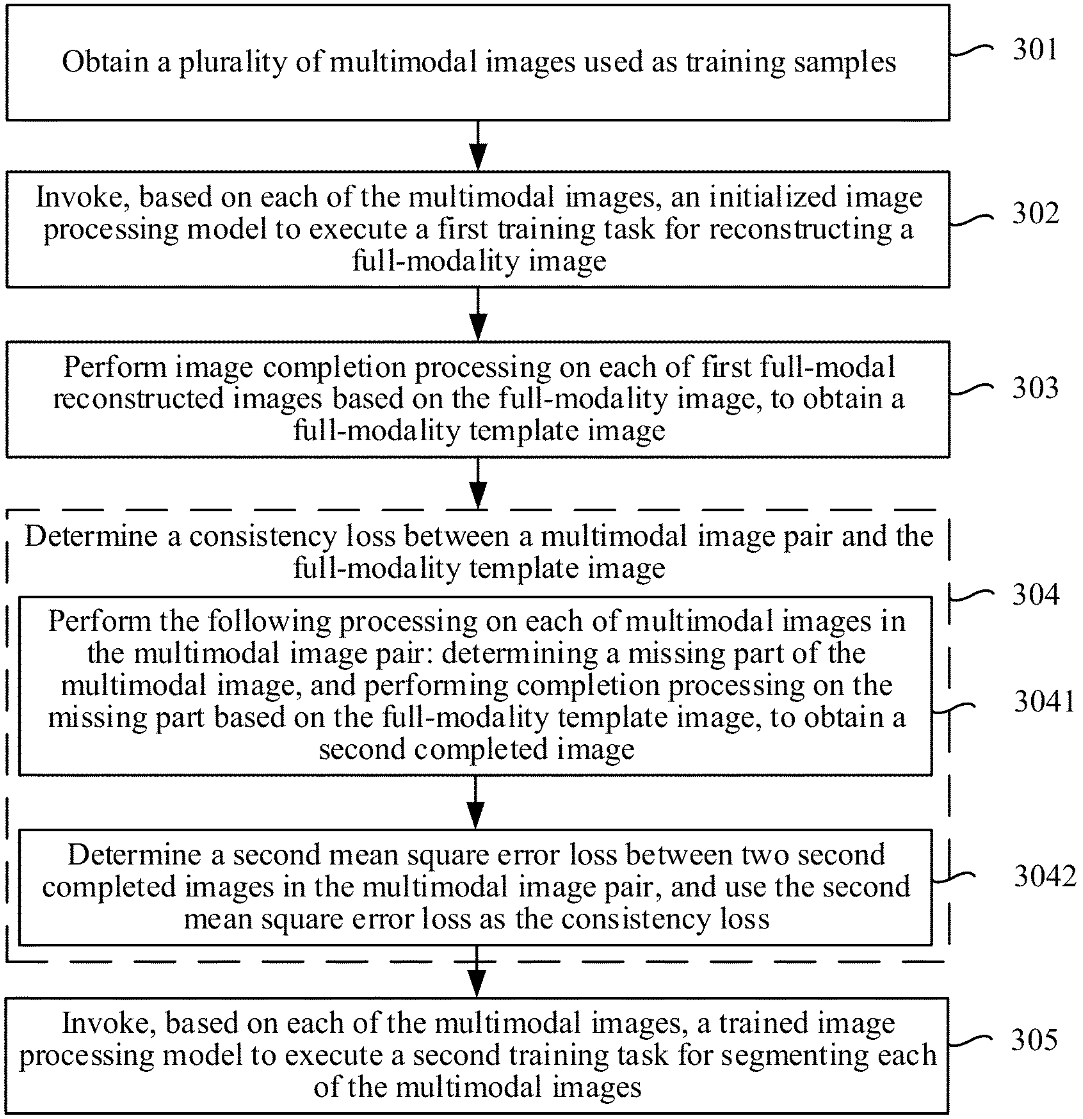
Figure 3G:
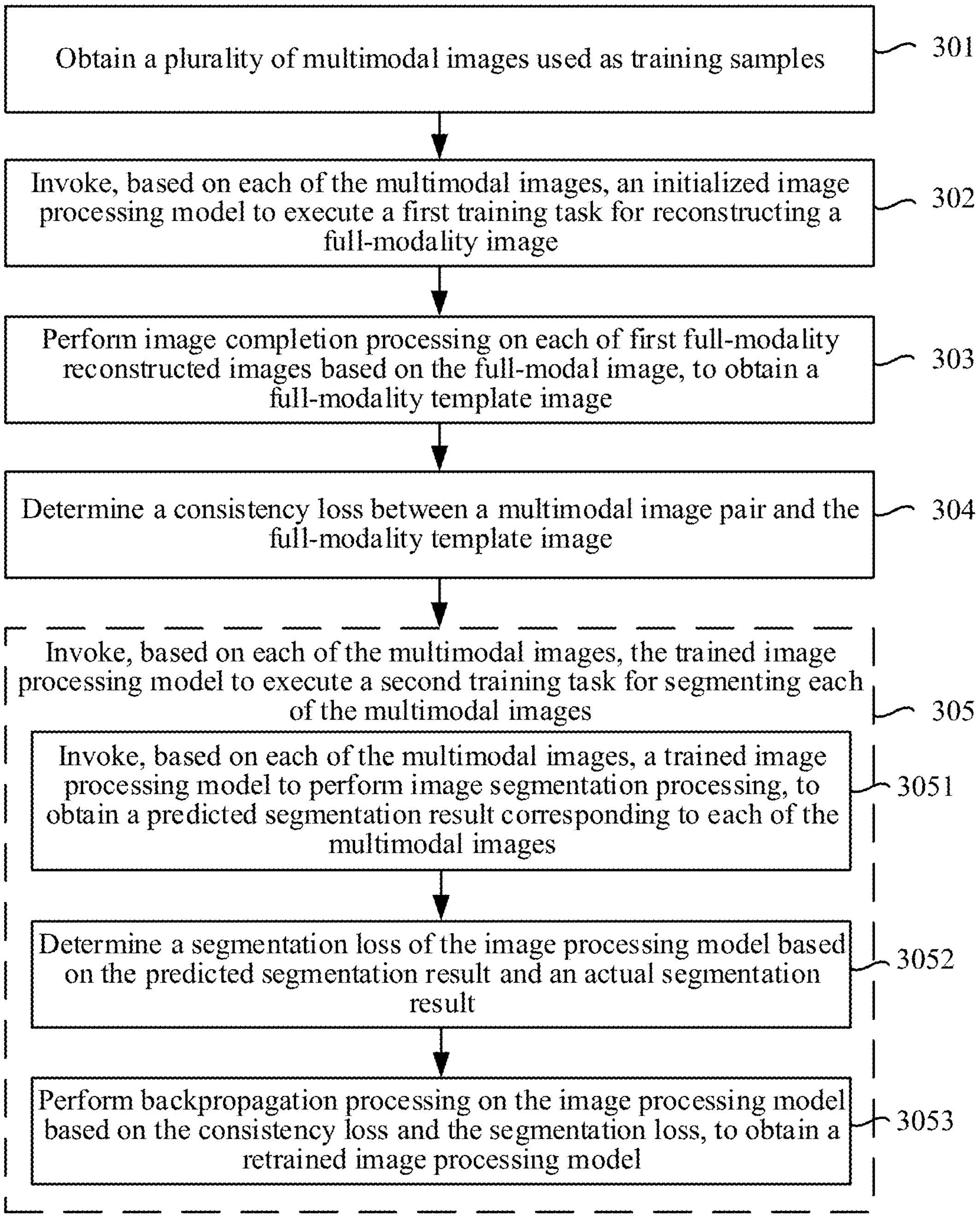
Figure 3H:
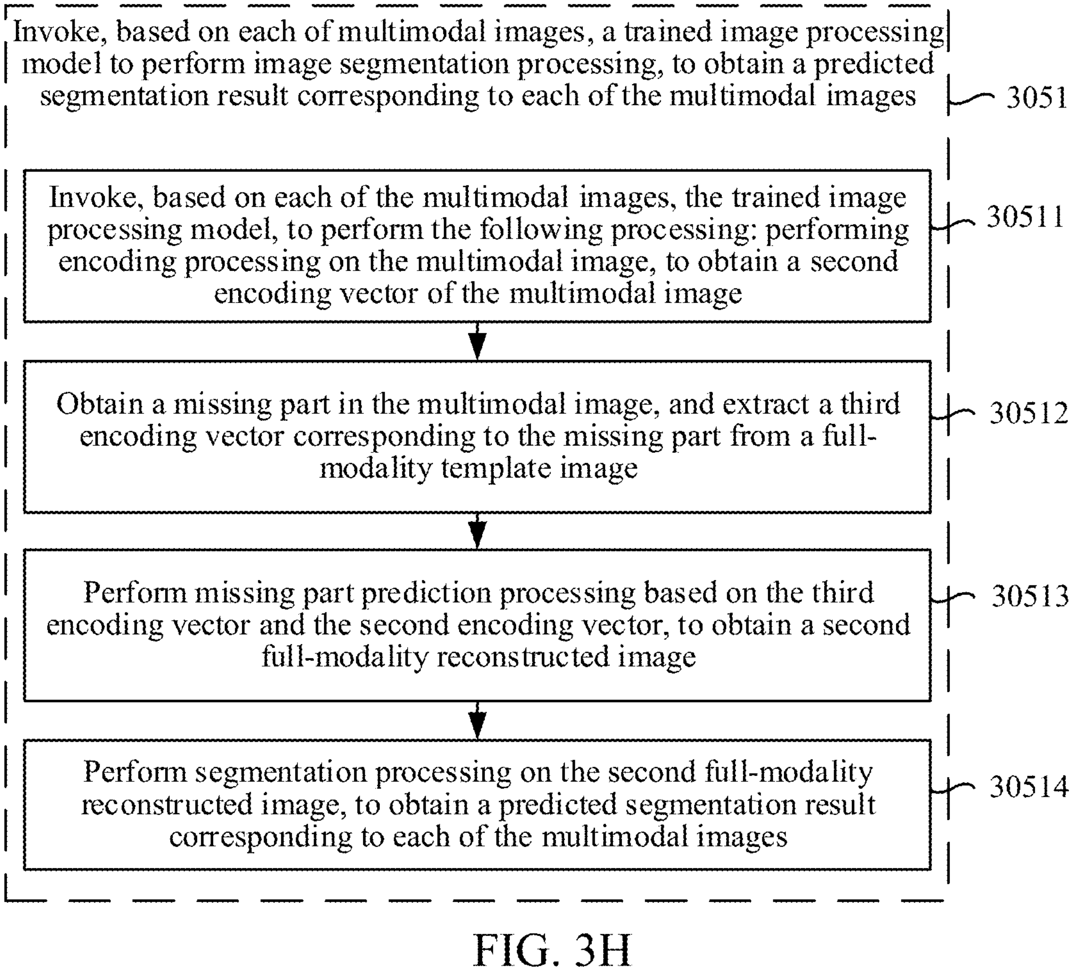
Figure 3I:
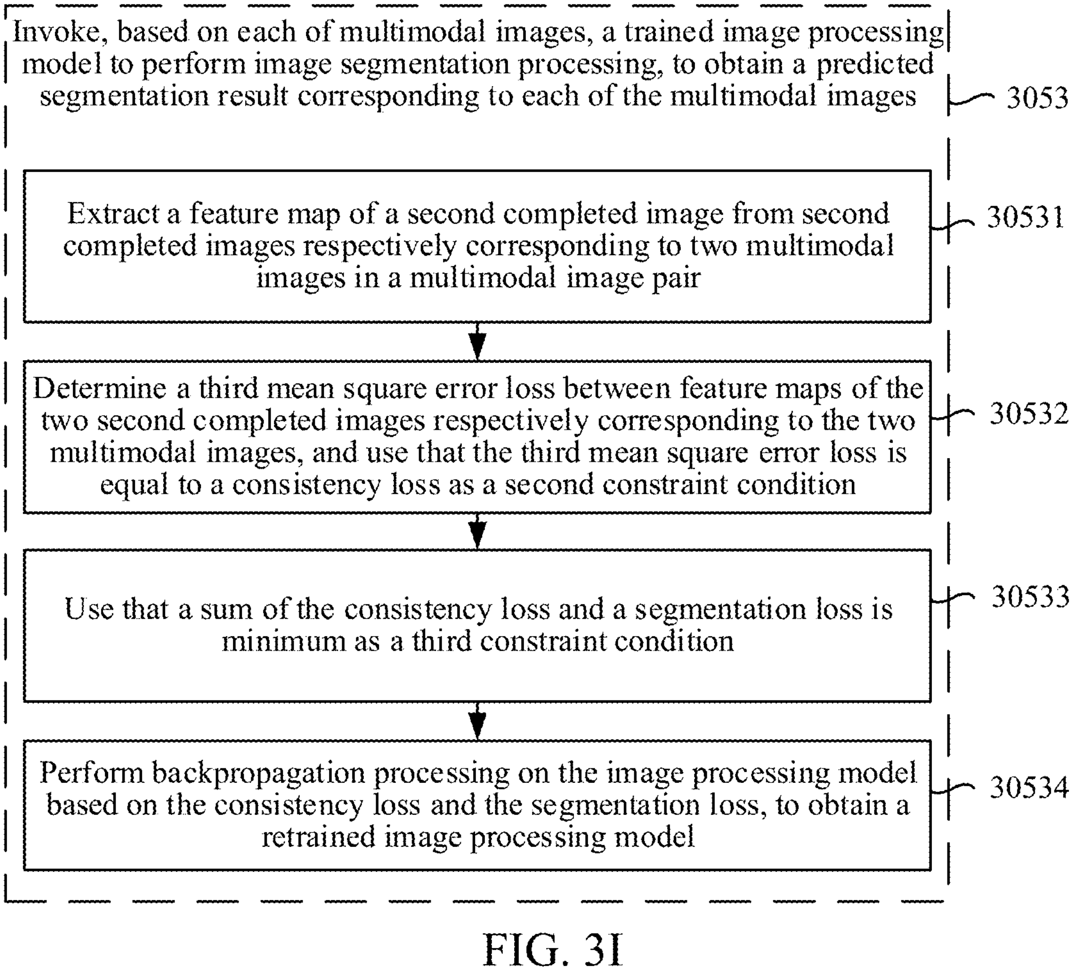
Figure 3J:
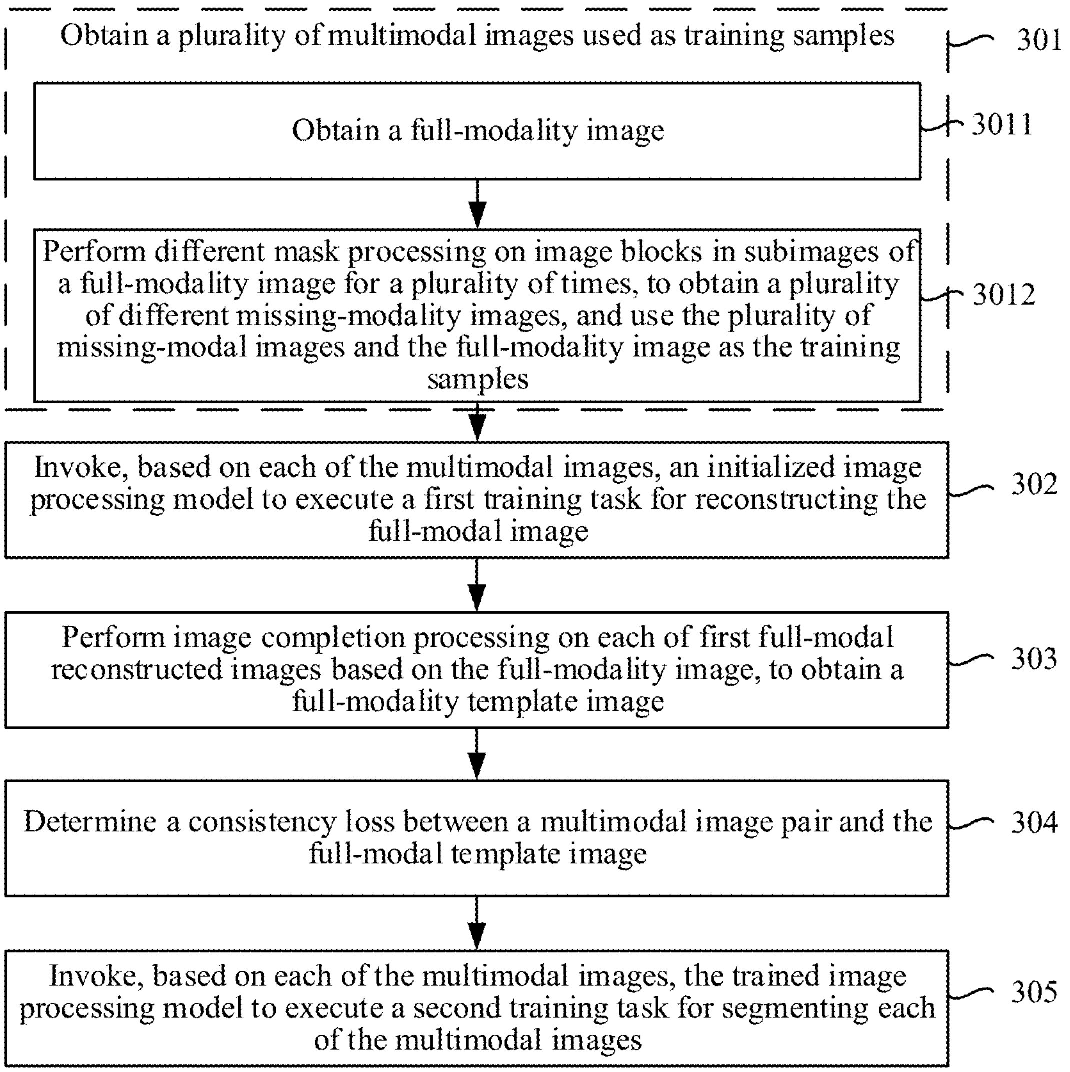

In some embodiments, FIG. 3J is a schematic flowchart of a training method for an image processing model according to an embodiment of this application. Operation 301 in FIG. 3A is implemented through operation 3011 and operation 3012 in FIG. 3J, which is described below in detail.

Operation 3011: Obtain a full-modality image.

For example, the full-modality image includes subimages of multiple modalities. An example in which the multimodal image is an MRI image is used for description. A full-modality MRI image having a region with abnormality (for example, a lesion) is obtained.

Operation 3012. Perform a plurality of times of different mask processing on image blocks in the subimages of the full-modality image, to obtain a plurality of different missing-modality images, and use the plurality of missing-modality images and the full-modality image as the training samples.

Figure 4A:
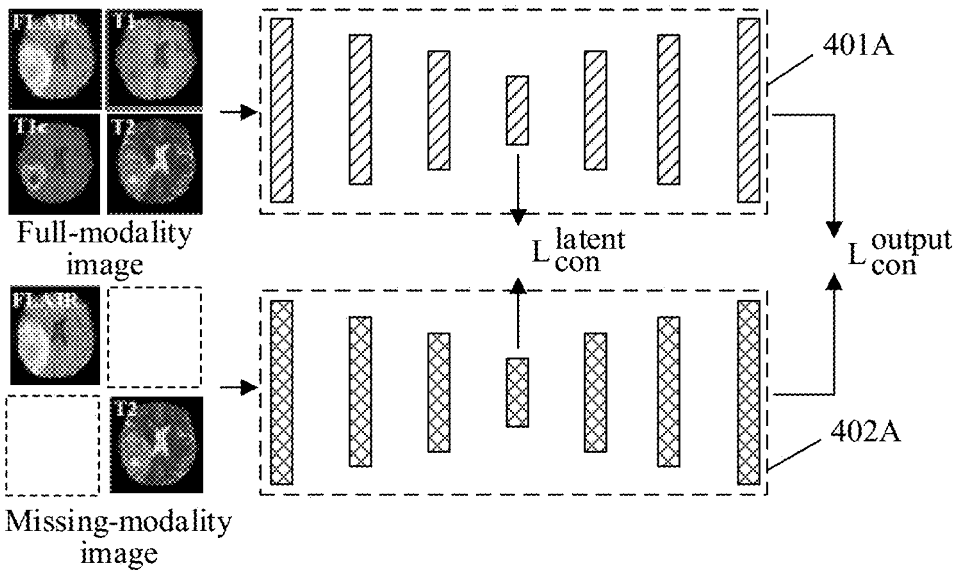
FIG. 4A is a schematic diagram showing a principle of co-training.
Figure 4B:
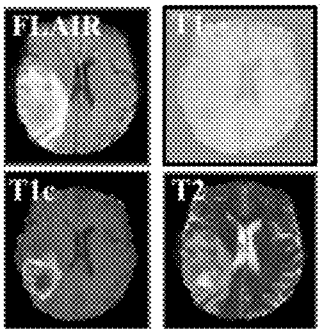
FIG. 4B is a schematic diagram showing a missing-modality image according to an embodiment of this application.
Figure 4C:
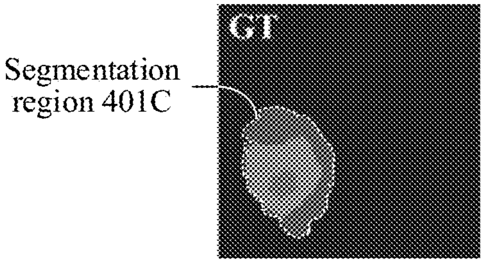
FIG. 4C is a schematic diagram showing a segmentation region according to an embodiment of this application.
Figure 4D:
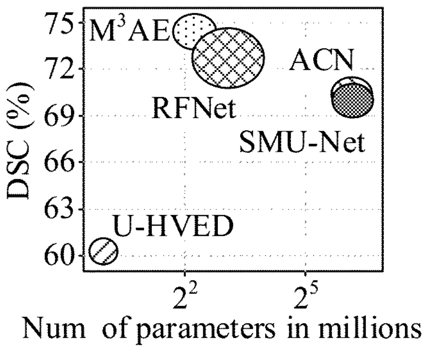
FIG. 4D is a diagram showing comparison of training effects according to an embodiment of this application.
Figure 4E:
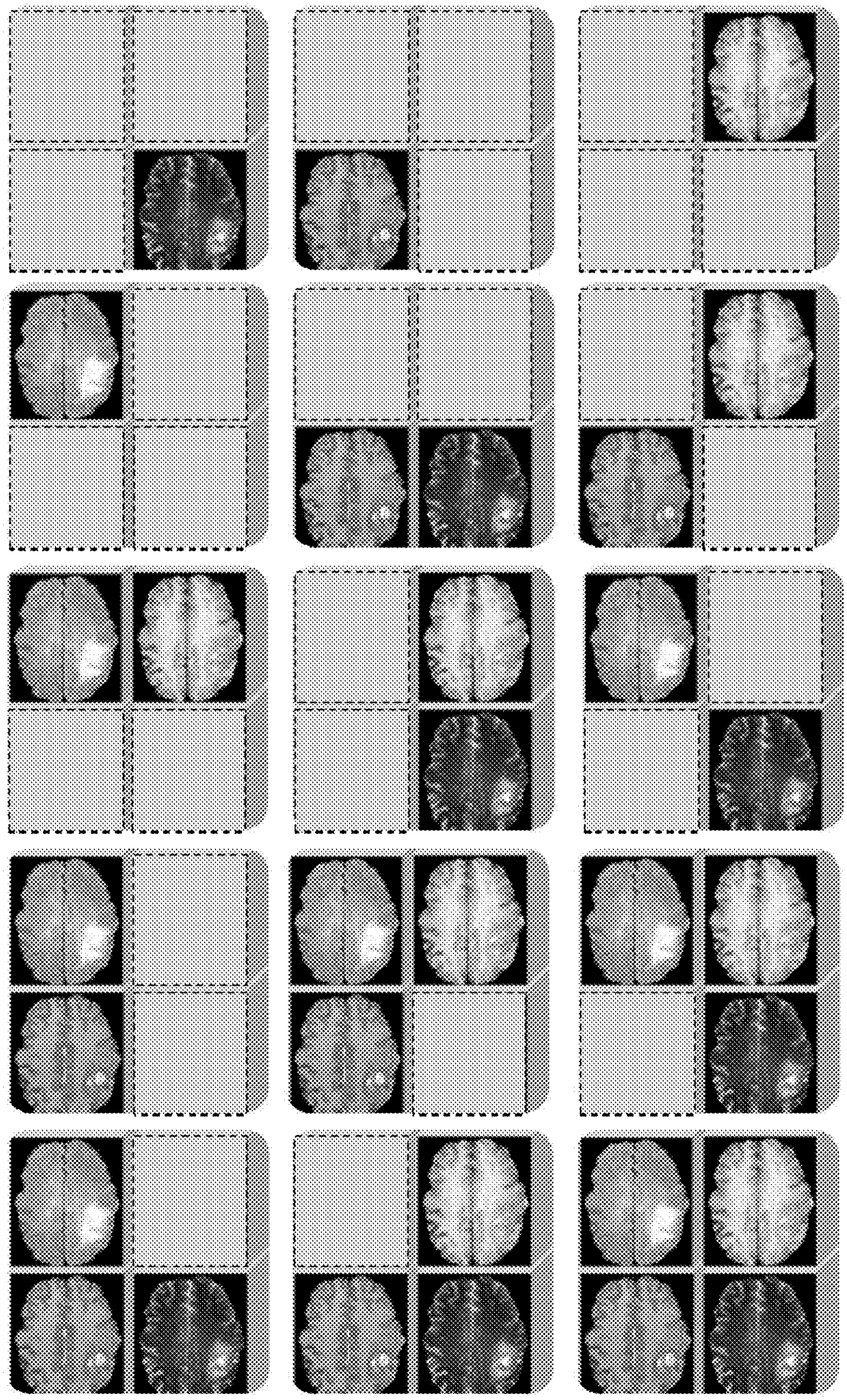
FIG. 4E is a schematic diagram showing a training sample according to an embodiment of this application.

For example, performing mask processing on an entire subimage is a special case of processing the image blocks of the subimages. FIG. 4E is a schematic diagram showing a training sample according to an embodiment of this application. FIG. 4E shows 15 training samples. A full-modality image includes four modalities, each mask processing masks the modalities in the full-modality image, to obtain 15 different training samples of multimodal images, including full-modality images and missing-modality images.

Figure 2C:
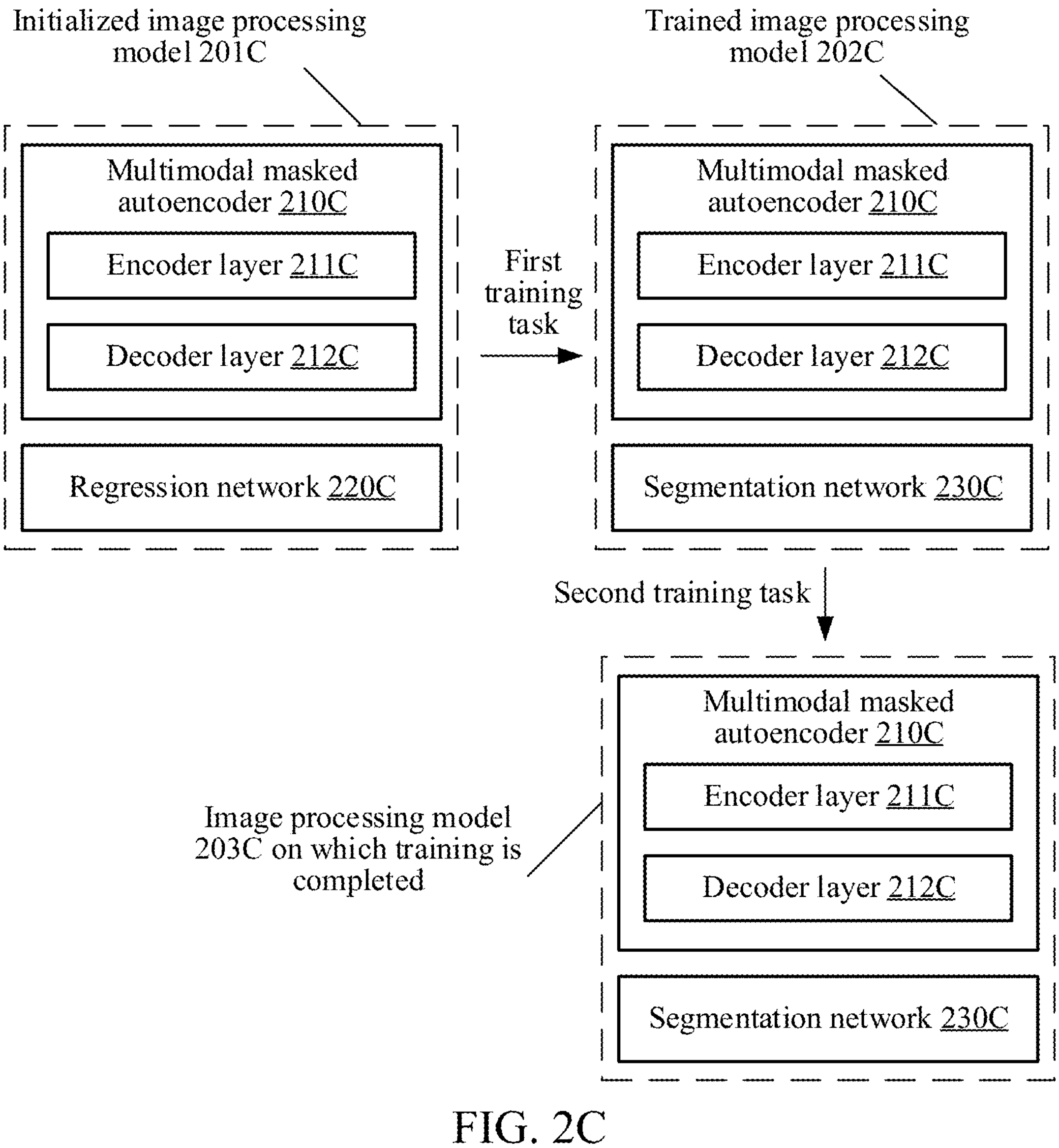
FIG. 2C is a schematic diagram showing structure of an image processing model according to an embodiment of this application.

In some embodiments, FIG. 2C is a schematic diagram showing structure of an image processing model according to an embodiment of this application. An initialized image processing model 201C includes: a multimodal masked autoencoder 210C. The multimodal masked autoencoder 210C is configured to perform mask processing on the full-modality image.

For example, the initialized image processing model does not have function of accurately reconstructing a missing part in the multimodal image, but can perform mask processing on the full-modality image to obtain images of different missing modalities.

In this embodiment of this application, the training sample is obtained by using the initialized image processing model, a label corresponding to the training sample can be synchronously obtained in a process of obtaining the training sample, reducing cost of obtaining the training sample, reducing complexity of training tasks, and reducing computing resources required for the server to train the model.

Refer to FIG. 3A. Operation 302. Invoke, based on each of the multimodal images, an initialized image processing model to execute a first training task for reconstructing the full-modality image.

For example, in a process of executing the first training task, the image processing model outputs a first full-modality reconstructed image corresponding to each of the multimodal images. An objective of the first training task is to enable the initialized image processing model to have a function of reconstructing a multimodal image with a missing part.

For ease of description, the multimodal image in the training samples is indicated as $x \in \mathbb{R}^{N \times D \times H \times W}$. W, H, and D are respectively a width W and a height H of the image, and a number D of slices in the image, N is a number of modalities, and each modality of the multimodal image x includes a plurality of blocks. The multimodal image includes: missing-modality images $x_0, x_1, \ldots, x_n$, and a full-modality image $x^{sub}$. n is a positive integer greater than 1.

In some embodiments, FIG. 3B is a schematic flowchart of a training method for an image processing model according to an embodiment of this application. Operation 302 in FIG. 3A is implemented through operation 3021 to operation 3023 in FIG. 3B, which is described below in detail.

Operation 3021. Invoke, based on each of the multimodal images, the initialized image processing model to perform reconstruction processing, to obtain the first full-modality reconstructed image corresponding to each of the multimodal images.

For example, the reconstruction processing is implemented in the following manner: predicting the missing part based on a non-missing part in the multimodal image, to obtain a predicted missing part, and combining the predicted missing part and the multimodal image, to obtain a completed reconstructed image.

In some embodiments, FIG. 3C is a schematic flowchart of a training method for an image processing model according to an embodiment of this application. Operation 3021 in FIG. 3B is implemented through operation 30211 to operation 30213 in FIG. 3C, which is described below in detail.

Operation 30211. Invoke, based on each of the multimodal images, the initialized image processing model, to perform the following processing: performing encoding processing on the multimodal image, to obtain a first encoding vector of the multimodal image.

For example, the first encoding vector is an encoding vector of a non-missing part in the multimodal image. FIG. 4B is a schematic diagram showing a missing-modality image according to an embodiment of this application. Non-missing parts in the missing-modality image are three modalities, including FLAIR, T1c, and T2. The missing part is a T1 modality. An exemplary missing-modality image shown in FIG. 4B is used as an example for description. The three modalities FLAIR, T1c, and T2 in the missing-modality image are encoded, to obtain the first encoding vector.

Operation 30212. Perform missing part prediction processing based on the first encoding vector, to obtain a first prediction vector of the missing part in the multimodal image.

For example, the example in the above is still used for description. Prediction is performed on the missing part (a subimage corresponding to the T1 modality in FIG. 4B) based on the first encoding vector, to obtain an encoding vector of the missing part, namely, the first prediction vector.

Operation 30213. Perform integration processing on the first prediction vector and the first encoding vector, to obtain the first full-modality reconstructed image.

For example, the first encoding vector corresponding to the non-missing part and the first prediction vector of the missing part are completed as an encoding vector corresponding to the full-modality image, and the encoding vector is restored to an image, to obtain a first full-modality reconstructed image, which may be indicated as a full-modality image $x^{sub}$.

In some embodiments, referring to FIG. 2C, the initialized image processing model 201C includes: the multimodal masked autoencoder 210C and a regression network 220C. The multimodal masked autoencoder includes: an encoder layer 211C and a decoder layer 212C. The encoder layer 211C is configured to perform the encoding processing; the decoder layer 212C is configured to perform the missing part prediction process; and the regression network 220C is configured to perform the integration processing.

Refer to FIG. 3B. Operation 3022. Determine a first mean square error loss based on each first full-modality reconstructed images and the full-modality image.

The first mean square error loss may be indicated as formula $\mathcal{L}_{mse}(x, F(S(x_i, x^{sub})))$. x indicates the full-modality image in the training samples, $\mathcal{L}S(x_i, x^{sub})$ indicates an operation in which content of a missing part in a multimodal image $x_i$ is substituted by content in a corresponding position of a first full-modality reconstructed image $x^{sub}$, and F is a reconstruction function cascading the multimodal masked autoencoder and the regression network (regression head).

Operation 3023. Perform backpropagation processing on the initialized image processing model based on the first mean square error loss, to obtain the trained image processing model (i.e., the image processing model that has been trained).

In an implementation of this application, backpropagation processing is iteratively performed on the initialized image processing model, and a constraint condition in the backpropagation processing is described below. FIG. 3D is a schematic flowchart of a training method for an image processing model according to an embodiment of this application. Operation 3023 in FIG. 3B is implemented through operation 30231 and operation 30232 in FIG. 3D, which is described below in detail.

Operation 30231. Substitute the first full-modality reconstructed image into a regular function, to obtain a first regularization term, and use that a sum of the first mean square error loss and the first regularization term is minimum as a first constraint condition.

For example, the regular function is specifically R( ), $\mathcal{R}$ is a regularization term of $L_2$, and the first constraint condition may be summarized as the following formula (3):

$$\min_{F, x^{sub}} \mathcal{L}_{mse}(x, F(S(x_i, x^{sub}))) + \gamma \mathcal{R}(x^{sub}) \tag{3}$$

γ is a weight, and may be set according to an actual requirement of training.

Operation 30232. Update a parameter of the initialized image processing model based on the first constraint condition and the first mean square error loss, to obtain the trained image processing model.

For example, the parameter of the initialized image processing model is iteratively updated, until the first constraint condition is met, and the image processing model meeting the first constraint condition is used as the trained model. Referring to FIG. 2C, through the first training task, the trained image processing model 202C is obtained. After the first training task, the regression network 220C is substituted into a segmentation network 230C, to facilitate performing a second training task.

In this embodiment of this application, the image processing model can learn a relationship between different modalities in the multimodal image through the first training task, so that the image processing model has a function of reconstructing an image, and accuracy of completing a missing part in a missing-modality image is improved.

Refer to FIG. 3A. Operation 303. Perform image completion processing on each of the first full-modality reconstructed images based on the full-modality image, to obtain a full-modality template image.

For example, operation 303 and the backpropagation processing in operation 302 are performed synchronously. When the first full-modality reconstructed image is obtained, the full-modality template image is obtained based on the first full-modality reconstructed image and the full-modality image. In the process of iterative backpropagation processing, the full-modality template image is constantly optimized by using the first full-modality reconstructed image obtained by forward propagation outputting before each backpropagation processing. When the first training task ends, an optimized full-modality template image is also obtained.

In some embodiments, FIG. 3E is a schematic flowchart of a training method for an image processing model according to an embodiment of this application. Operation 303 in FIG. 3A is implemented through operation 3031 to operation 3034 in FIG. 3E, which is described below in detail.

Operation 3031. Perform the following processing on each of the multimodal images: determining a missing part in the multimodal image, and performing completion processing on the missing part based on the first full-modality reconstructed image, to obtain a first completed image.

For example, operation 3031 may be indicated as the following formula $S(x_i,x^{sub})$. In other words, the content in the corresponding position of the first full-modality reconstructed image $x^{sub}$ is used to fill the missing part in the multimodal image $x_i$, to obtain the first completed image.

Operation 3032. Perform linear regression processing on the first completed image, to obtain a linear regression result, and obtain the first mean square error loss between the linear regression result and the full-modality image.

For example, the linear regression processing is implemented through the regression network, and the linear regression processing may be indicated as formula $F(S(x_i, x^{sub}))$. The first mean square error loss is described above, and details are not described herein again.

Operation 3033. Obtain, the first full-modality reconstructed images, a target full-modality reconstructed image minimizing the first mean square error loss, and substitute the target full-modality reconstructed image into a regular function, to obtain a first regularization term.

For example, the first regularization term is described above, and details are not described herein again.

Operation 3034. Use a sum of the first regularization term and the target full-modality reconstructed image as the full-modality template image.

For example, the full-modality template image $x^{sub}$ may be indicated as the following formula (1):

$$\hat{x}^{sub} = \underset{x^{sub}}{\operatorname{argmin}} \mathcal{L}_{mse}(x, F(S(x_i, x^{sub}))) + \gamma\mathcal{R}(x^{sub}) \quad (1)$$

In this embodiment of this application, the full-modality template image is obtained, so that the image processing model learns the relationships between modalities in the multimodal image. The accuracy of reconstructing the multimodal image is improved, and calculation resources are saved.

Refer to FIG. 3A. Operation 304. Determine a consistency loss between a multimodal image pair and the full-modality template image.

For example, the multimodal image pair includes any two multimodal images. It is assumed that the two multimodal images are respectively indicated as a first image $x_0$ and a second image $x_1$. The consistency loss may be indicated as $\mathcal{L}_{con}(x_0,x_1,\hat{x}^{sub})$. In other words, a mean square error loss between images after the first image $x_0$ and the second image $x_1$ are respectively completed by the full-modality template image $\hat{x}^{sub}$ is obtained.

In some embodiments, FIG. 3F is a schematic flowchart of a training method for an image processing model according to an embodiment of this application. Operation 304 in FIG. 3A is implemented through operation 3041 and operation 3042 in FIG. 3F, which is described below in detail.

Operation 3041. Perform the following processing on each of the multimodal images in the multimodal image pair: determining a missing part of the multimodal image, and performing completion processing on the missing part based on the full-modality template image, to obtain a second completed image.

For example, the modality T1 is missing in the first image $x_0$, and the modality T1 in the full-modality template image $\hat{x}^{sub}$ is added to the first image $x_0$, to obtain a second completed image. The modality T1c is missing in the second image $x_1$, and the modality T1c in the full-modality template image $\hat{x}^{sub}$ is added to the second image $x_0$, to obtain another second completed image.

Operation 3042. Determine a second mean square error loss between two second completed images in the multimodal image pair, and use the second mean square error loss as the consistency loss.

For example, the two second completed images respectively corresponding to the multimodal images in the multimodal image pair include: a second completed image of the first multimodal image in the multimodal image pair and a second completed image of the second multimodal image in the multimodal image pair. For a manner of obtaining the mean square error loss, refer to operation 3022, and details are not described herein again.

In this embodiment of this application, the consistency loss is obtained, for introducing a self-distillation manner to train the image processing model, thereby facilitating consistency of multimodal images in different missing-modality situations in a latent space of the image processing model, and improving accuracy of segmenting images of the image processing model.

Refer to FIG. 3A. Operation 305. Invoke, based on each of the multimodal images, the trained image processing model to execute a second training task for segmenting each of the multimodal images.

For example, the image processing model invoked in operation 305 is the image processing model (the trained image processing model 202C in FIG. 2C) trained in the first training task. The consistency loss is used as a constraint condition of updating the parameter of the image processing model in the second training task.

In some embodiments, FIG. 3G is a schematic flowchart of a training method for an image processing model according to an embodiment of this application. Operation 305 in FIG. 3A is implemented through operation 3051 to operation 3053 in FIG. 3G, which is described below in detail.

Operation 3051. Invoke, based on each of the multimodal images, the trained image processing model to perform image segmentation processing, to obtain a predicted segmentation result corresponding to each of the multimodal images.

For example, the segmentation processing includes two parts: image reconstruction and segmenting a reconstructed image. In the trained image processing model, the regression network is replaced with the segmentation network, and redundancy of the model is reduced.

In some embodiments, FIG. 3H is a schematic flowchart of a training method for an image processing model according to an embodiment of this application. Operation 3051 in FIG. 3G is implemented through operation 30511 to operation 30514 in FIG. 3H, which is described below in detail.

Operation 30511. Invoke, based on each of the multimodal images, the trained image processing model, to perform the following processing: performing encoding processing on the multimodal image, to obtain a second encoding vector of the multimodal image.

For example, the second encoding vector is an encoding vector of the non-missing part in the multimodal image. For a principle of the encoding processing, refer to operation 30211 in FIG. 3C, and details are not described herein again.

Operation 30512. Obtain the missing part in the multimodal image, and extract a third encoding vector corresponding to the missing part from the full-modality template image.

For example, the missing part in the multimodal image is obtained, and an image block of a part in one-to-one correspondence to the position of the missing part are extracted from the full-modality template image, and encoding processing is performed based on the extracted image block, to obtain the third encoding vector.

Operation 30513. Perform missing part prediction processing based on the third encoding vector and the second encoding vector, to obtain a second full-modality reconstructed image.

For example, the image processing model is invoked, based on the third encoding vector and the second encoding vector, to perform prediction processing, to obtain a predicted image of the missing part in the multimodal image. The predicted image of the missing part is combined with the image of the non-missing part, to obtain the second full-modality reconstructed image.

In this embodiment of this application, an actually missing part in the multimodal image is predicted based on the third encoding vector and the second encoding vector, improving accuracy of reconstructing an image, thereby obtaining a second full-modality reconstructed image that is more consistent with an actual image.

Operation 30514. Perform segmentation processing on the second full-modality reconstructed image, to obtain a predicted segmentation result corresponding to each of the multimodal images.

In some embodiments, referring to FIG. 2C, the image processing model 202C trained after executing the first training task includes: the multimodal masked autoencoder 210C and a segmentation network 230C. The multimodal masked autoencoder 210C includes: the encoder layer 211C and the decoder layer 212C. The encoder layer 211C is configured to perform the encoding processing, and obtain the third encoding vector; the decoder layer 212C is configured to perform the missing part prediction process; and the segmentation network 230C is configured to perform the segmentation processing.

Refer to FIG. 3G. Operation 3052. Determine a segmentation loss of the image processing model based on the predicted segmentation result and an actual segmentation result.

For example, the multimodal image $x_i$ is segmented, and an obtained segmentation loss $\mathcal{L}_{seg}$ is indicated as the following formula (5):

$$\mathcal{L}_{seg}(s^{gt}, x_i, \hat{x}^{sub}) = \sum_{\alpha\in\{1,\frac{1}{2},\frac{1}{4}\}} \mathcal{L}(s^{gt}, \hat{s}_i^{\alpha}),\ i \in \{0, 1\} \tag{5}$$

$\mathcal{L}$ is a sum of a widely used Dice loss and a cross-entropy loss, $$\hat{s}_i^{\alpha}$$

is a result of segmenting the feature map outputted by a neural network layer corresponding to a sampling ratio α in the decoder layer 212C, namely, the predicted segmentation result. $s^{gt}$ indicates the actual segmentation result.

Refer to FIG. 3G. Operation 3053. Perform backpropagation processing on the image processing model based on the consistency loss and the segmentation loss, to obtain a retrained image processing model.

For example, the retrained image processing model (the image processing model 203C on which training is completed in FIG. 2C) is configured to segment a multimodal image with a missing modality. The consistency loss is used as a constraint condition in the backpropagation processing. FIG. 3I is a schematic flowchart of a training method for an image processing model according to an embodiment of this application. Operation 3053 in FIG. 3G is implemented through operation 30531 to operation 30534 in FIG. 3I, which is described below in detail.

Operation 30531. Extract a feature map of the second completed image from the second completed images respectively corresponding to the two multimodal images in the multimodal image pair.

In some embodiments, referring to FIG. 2C, the trained image processing model 202C includes the multimodal masked autoencoder 210C. The multimodal masked autoencoder 210C includes: the encoder layer 211C and a decoder layer 212C. The decoder layer 212C includes a multi-layered feature extraction layer (the neural network layer). The feature map is obtained by invoking the feature extraction layer.

Operation 30532. Determine a third mean square error loss between feature maps of the two second completed images respectively corresponding to the two multimodal images, and use that the third mean square error loss is equal to the consistency loss as a second constraint condition.

For example, the second constraint condition may be indicated as the following formula (2):

$$\mathcal{L}_{con}(x_0, x_1, \hat{x}^{sub}) = \mathcal{L}_{mse}(f_0, f_1) \tag{2}$$

$x_0$ and $x_1$ are respectively two different missing-modality situations of the multimodal image x. $f_0, f_1 \in \mathbb{R}^{C \times D' \times H' \times W'}$ feature maps in latent spaces corresponding to $S(x_0,\hat{x}^{sub})$ and $S(x_1,\hat{x}^{sub})$ and C, D', H', W' are respectively a number of channels, a depth, a height, and a width of the feature map. Formula (2) means obtaining a mean square error $\mathcal{L}_{mse}$ between the feature maps in the latent spaces respectively corresponding to $S(x_0,x^{sub})$ and $S(x_1,\hat{x}^{sub})$, and obtaining a consistency loss $\mathcal{L}_{con}$ between $S(x_0,\hat{x}^{sub})$ and $S(x_1,\hat{x}^{sub})$ In a self-distillation process, using that the consistency loss $\mathcal{L}_{con}$ is equal to the mean square error $\mathcal{L}_{mse}$ as an objective, the parameter of the multimodal masked autoencoder is adjusted.

Operation 30533. Use that a sum of the consistency loss and the segmentation loss is minimum as a third constraint condition.

For example, the third constraint condition may be indicated as the following formula (4):

$$\min_{f,f_s} \sum_{i=0}^{1} \mathcal{L}_{seg}(s^{gt}, x_i, \hat{x}^{sub}) + \lambda \mathcal{L}_{con}(x_0, x_1, \hat{x}^{sub}) \tag{4}$$

$\mathcal{L}_{seg}$ is a segmentation loss, $s^{gt}$ is a segmentation annotation (annotating an actual segmentation region), and λ is a loss weight. λ is set to 0.1 in this embodiment of this application. In this embodiment of this application, a deeply supervised policy is used for training a multimodal segmentation network (the image processing model).

Operation 30534. Update the parameter of the image processing model based on the consistency loss and the segmentation loss, until the second constraint condition and the third constraint condition are met.

For example, the second constraint condition indicates self-distillation, for promoting the consistency of multimodal images in different missing-modality situations in the latent of the image processing model, and the accuracy of segmenting images of the image processing model. The third constraint condition indicates improving accuracy of segmentation processing, and training is iteratively performed, until the constraint condition is met. This can improve accuracy of the image processing model performing segmentation processing on missing-modality images.

Figure 3K:
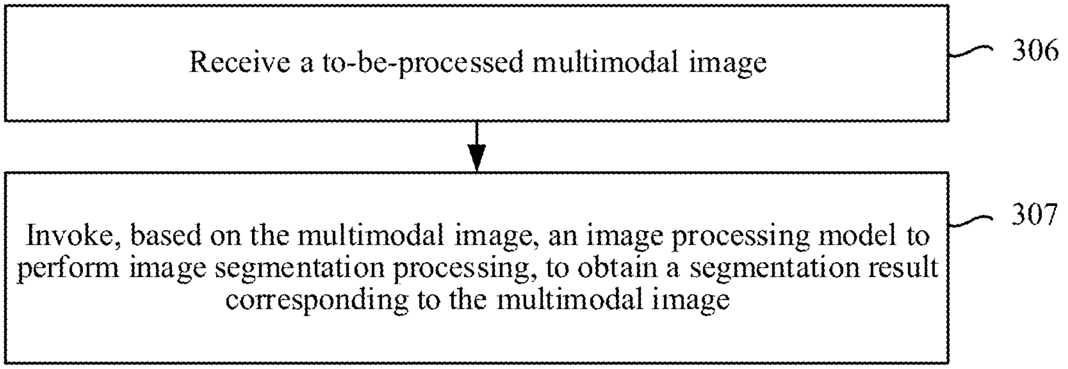

An embodiment of this application further provides an image processing method. FIG. 3K is a schematic flowchart of a training method for an image processing model according to an embodiment of this application. The method is described using the image processing server 200-2 in FIG. 1 as an execution entity with reference to operations shown in FIG. 3K.

Operation 306. Receive a to-be-processed multimodal image.

For example, the multimodal image may be an MRI image of a human organ, and there may be a missing part in the multimodal image.

Operation 307. Invoke, based on the multimodal image, the image processing model to perform image segmentation processing, to obtain a segmentation result corresponding to the multimodal image.

For example, in response to that there is a missing part in the multimodal image, the image processing server 200-2 invokes the image processing model to perform segmentation processing on the multimodal image. The image processing model is obtained by training based on the training method for an image processing model provided in the embodiments of this application.

In some embodiments, operation 307 is implemented in the following manner: invoking, based on the multimodal image, the image processing model to perform the following processing: performing encoding processing on the multimodal image, to obtain a fourth encoding vector of the multimodal image, the fourth encoding vector being an encoding vector of a non-missing part in the multimodal image; obtaining the missing part in the multimodal image, and extracting a fifth encoding vector corresponding to the missing part from the full-modality template image; performing missing part prediction processing based on the fourth encoding vector and the fifth encoding vector, to obtain a third full-modality reconstructed image; and performing segmentation processing on the third full-modality reconstructed image, to obtain a predicted segmentation result corresponding to the multimodal image.

In some embodiments, referring to FIG. 2C, the image processing model 203C on which training is completed includes: the multimodal masked autoencoder 210C and the segmentation network 230C. The multimodal masked autoencoder includes: the encoder layer 211C and the decoder layer 212C. The encoder layer is configured to perform the encoding processing, and obtain the fifth encoding vector; the decoder layer is configured to perform the missing part prediction process; and the segmentation network 230C is configured to perform the segmentation processing.

In the embodiments of this application, through staged training for the image processing model, the image processing model has a function of reconstructing a missing part in multimodal images, and a function of accurately segmenting a specific region in multimodal images. The consistency loss is used as the constraint condition, so that when processing multimodal images with different missing modalities, the image processing model can keep consistency between segmentation results, which improves the accuracy of segmentation of multimodal images. An exemplary application of the training method for an image processing model provided in the embodiments of this application in an actual application scenario is described below.

In clinical application, MRI images includes subimages of multiple modalities. Due to image corruption, artifacts, acquisition protocols, patient allergies to contrast agents, cost, or the like, one or more modalities are generally missing in the MRI images. Processing multimodal images with missing modalities includes two types of methods: a dedicated method and a general method. In the general method, only one model is trained to handle all missing-modality situations. In the dedicated method, one model needs to be dedicatedly trained for each missing-modality situation (for a task having N modalities, in the dedicated method, $2^N-1$ models need to be trained).

In the related art, in the general method, whether explicitly generating a missing modality or generating a general feature representation in a latent space includes complex model design, for example, a plurality of encoders and decoders and complex interaction inside the model. This results in complex processing procedures, and more parameter and a larger amount of calculation are needed during training and deployment. In addition, the existing general method ignores relationships between different modality combinations, and obtained model performance is suboptimal.

The dedicated method enables the model to obtain a good result in a missing-modality situation, and in particular, a case with a large number of missing modalities, by using a co-training policy. FIG. 4A is a schematic diagram showing a principle of co-training. FIG. 4A shows a process of co-training in the related art. An image processing model 401A is trained based on the full-modality image (including four modalities: FLAIR, T1, T1c, and T2). An image processing model 402A is trained based on a missing-modality image (T1 and T1c are missing compared with the full-modality image). Consistency constraint is respectively performed between a feature and an output of a model corresponding to the full-modality situation and (one of) the missing-modality situation. For each missing-modality situation, training is required separately.

$$\mathcal{L}_{con}^{latent}$$

and $$\mathcal{L}_{con}^{output}$$

respectively indicate the consistency constraint between a network feature (a latent space) and an output corresponding to the full-modality image ($x_{full}$) and the missing-modality image ($x_{missing}$).

However, because the dedicated method needs to respectively training models for each missing-modality situation, more time and calculation costs are needed for training, and more storage space is needed for deployment. In addition, the existing dedicated method can only perform mutual distillation in a situation in which a pair of modality are different (for example, a full modality and any single modality), and cannot model relationship between multiple missing-modality situations.

The training method for an image processing model provided in the embodiments of this application belongs to a general method of processing missing modalities, training one image processing model to handle all missing-modality situations. The multimodal masked autoencoder in the embodiments of this application adopts a classic single encoder-decoder structure, by designing pretraining and adding model inversion to complete the missing modalities, the image processing model learns good full-modality and missing-modality feature representation without a task-related annotation in a self-supervision manner. In addition, in the method in the embodiments of this application, the training policy of self-distillation is added in a fine-tuning process, so that the model has better performance on segmentation tasks in both the missing-modality and the full-modality situations. The model on which training is completed in the embodiments of this application performs knowledge distillation between feature maps corresponding to different modality situations (including the full-modality and the missing-modality situations), only one model needs to be trained to handle all missing-modality situation compared with co-training, and better effects can be implemented in both the full-modality and the missing-modality situations. FIG. 4D is a diagram showing comparison of training effects according to an embodiment of this application. FIG. 4D shows a quantity of parameters of models trained in different schemes during deployment, and an average Dice coefficient (DSC % in FIG. 4D) based on all missing-modality combinations on the public benchmark dataset BraTS 2018 test set. The Dice coefficient is a set similarity measure function, and is the most commonly used index to evaluate medical image segmentation. It uses a value between 0 and 1 to measure a degree of overlap between a segmented area and an actual tumor area (ground truth). A higher Dice coefficient indicates better segmentation performance. A radius of a model circle indicates computation complexity. The computation complexity can be obtained by calculating a giga floating-point operations per second (GFLOPS) of a model. Four existing optimal schemes are compared: a heteromodal variational encoder-decoder (U-HVED) for simultaneous modal completion and segmentation, an adversarial joint training network (ACN) for brain tumor segmentation in missing modalities, style matching (U-Net) (SMU-Net) in missing-modality brain tumor segmentation, and a region-aware fusion network (RFNet) for incomplete multi-modal brain tumor segmentation. Referring to FIG. 4D, the image processing model obtained by training based on the multimodal masked autoencoder ($M^3$AE) in the embodiments of this application implements a better segmentation effect than that in the related art in a case that both a quantity of parameters and calculation complexity are relatively low.

FIG. 8 is a schematic flowchart of a training method for an image processing model according to an embodiment of this application. The training method for an image processing model provided in the embodiments of this application is described using a server as an execution entity with reference to FIG. 8.

Operation 801. Obtain a training sample.

For example, the training sample is generated by using a multimodal masked autoencoder that is not trained. A full-modality image is inputted to the multimodal masked autoencoder that is not trained, and a part of modalities and a part of blocks in remaining modalities are randomly abandoned through the multimodal masked autoencoder that is not trained, to construct the training sample.

Figure 6:
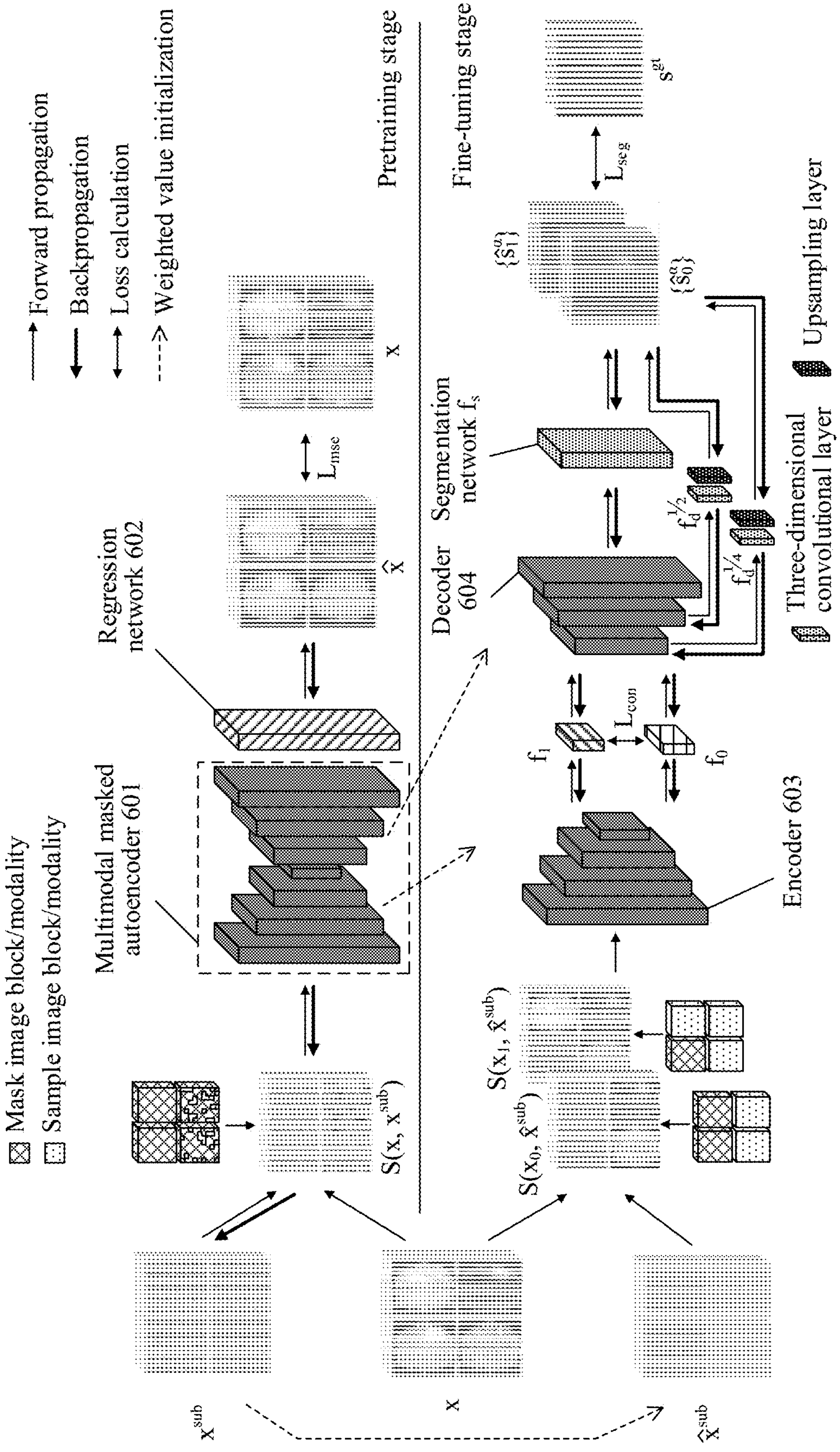
FIG. 6 is a schematic diagram showing a training process of an image processing model according to an embodiment of this application.

For example, FIG. 6 is a schematic diagram showing a training process of an image processing model according to an embodiment of this application. The multimodal masked autoencoder that is not trained includes a multimodal masked autoencoder 601 and a regression network 602. The multimodal masked autoencoder 601 includes an encoder 603 and a decoder 604. The encoder 603 and the decoder 604 include a plurality of feature extraction layers.

A multimodal masked autoencoder pretraining frame ($M^3$AE) is a masked autoencoder pretraining method for medical multimodal images. A multimodal image $x \in \mathbb{R}^{N\times D\times H\times W}$ is provided, W is a width of the image, H is a height of the image, D is a number of slices in the image, and N is a number of modalities. Each modality of the multimodal image x includes a plurality of blocks, and there is no following type of missing in the multimodal image x: modality missing or block missing in the modality. The multimodal image x is configured for being used as a sample template. A plurality of different training samples can be obtained through random sampling based on the multimodal image. Random sampling is performed to generate a missing-modality image with missing according to the multimodal image x, or extracting the full-modality image. The plurality of missing-modality images obtained by random sampling and the full-modality image are used as training samples.

In a practical scenario, any one or a plurality of modalities in the image may be missing. In the above case, the training sample can be obtained in the following manner: [00181] outputting the multimodal image x to the multimodal masked autoencoder $M^3AE$ that is not trained. The multimodal masked autoencoder $M^3AE$ that is not trained does not have a function of reconstructing a missing part in the multimodal image, but still can execute a function of random masking. Therefore, the multimodal masked autoencoder that is not trained masks a part of modalities of the multimodal image x to simulate a missing-modality situation, and also randomly masks a part of three-dimensional blocks of remaining modalities that may be obtained. An effect corresponds to the figure below. A plurality of training sample images in different modality situations are obtained based on $x \in \mathbb{R}^{N \times D \times H \times W}$. The plurality of training sample images may be indicated as multimodal images $x_0, x_1, \ldots, x_n$ with missing parts, and a full-modality image $x^{sub}$. n is a positive integer greater than 1.

For example, an example in which random masking is performed for each modality is used for description. FIG. 4E is a schematic diagram showing a training sample according to an embodiment of this application. FIG. 4E shows 15 training samples. A full-modality image includes four modalities, each mask processing masks the modalities in the full-modality image, to obtain 15 different training samples of multimodal images, including full-modality images and missing-modality images.

Refer to FIG. 8. Operation 802. Pretrain an image processing model in an MI manner, to obtain a full-modality image configured for modality completion.

For example, operation 802 corresponds to the first training task above. By using MI, in this embodiment of this application, a method that can save time and space, and obtain synthetic data that completes the missing modalities at a very low cost is designed based on the multimodal masked autoencoder. MI has been long used in the field of deep learning interpretability. A goal of this technology is to synthesize some most representative images predicted through a network, for example, saliency maps for classification.

MI may be implemented in the following manner: the multimodal masked autoencoder is invoked based on the sample images; the encoder in the multimodal masked autoencoder encodes the sample images, to obtain an encoding vector of the image; and the decoder in the multimodal masked autoencoder predicts a pixel value vector of the missing part based on the encoding vector, and integrates the pixel value vector of the missing part with a pixel value vector of the non-missing part, to obtain a completed full-modality image $x^{sub}$.

A full-modality template image $\hat{x}^{sub} \in \mathbb{R}^{N \times D \times H \times W}$ is obtained by optimization based on each training sample $x_i$ and the full-modality image $x^{sub}$ corresponding to the training sample $x_i$. The optimized full-modality image $\hat{x}^{sub}$ can enable the model to better reconstruct a part of masked images. An optimization target $\hat{x}^{sub}$ (the full-modality template image) may be indicated as the following formula (1):

$$\hat{x}^{sub} = \underset{x^{sub}}{\operatorname{argmin}} \mathcal{L}\_\text{mse}\left(x, F\left(S\left(x_i, x^{sub}\right)\right)\right) + \gamma \mathcal{R}\left(x^{sub}\right) \quad (1)$$

$x_i$ is a sample image with missing modalities randomly generated based on the multimodal image x, $S(x_i, x^{sub})$ indicates an operation of replacing masked content in $x_i$ with content in the position corresponding to $x^{sub}$, F is a reconstruction function cascading a multimodal masked autoencoder f and a regression network (regression head), $\mathcal{L}_{mse}$ is an MSE loss, $\mathcal{R}$ is a regularization term of $L_2$, and $\gamma$ is a corresponding weight of $\mathcal{R}(x^{sub})$, set to 0.005.

$$\underset{x^{sub}}{\operatorname{argmin}()}$$

function is configured for obtaining $x^{sub}$ minimizing the MSE loss $\mathcal{L}_{mse}$.

Formula (1) means that $x_i$ with missing modalities is completed based on the predicted full-modality image, a mean square deviation between a completed image and the original full-modality image x, and $x^{sub}$ minimizing the MSE is obtained. $x^{sub}$ minimizing the MSE and a regularization term result of $L_2$ of the full-modality image $x^{sub}$ are added, to obtain the full-modality template image $\hat{x}^{sub}$.

For example, in a pretraining process, in the first pretraining, 0 is used for masking content in $x_i$. A plurality of pretrainings are iteratively performed. In each pretraining, corresponding content in the full-modality template image $\hat{x}^{sub}$ obtained by a previous training is used for completing the masked content of $x_i$, instead of directly masking the content by using 0 (blank mask).

In this embodiment of this application, through the above processing, the multimodal image with missing content (modalities or a part of blocks) can be better reconstructed, and completed content can represent information of a specific modality. This is helpful to improve an effect of multimodal segmentation in a case that a part of modalities are missing. In a practical pretraining process, the multimodal masked autoencoder is iteratively optimized through backpropagation, and the full-modality image $x^{sub}$ is optimized to obtain $\hat{x}^{sub}$. In such manner, a new model does not need to be introduced in a process of training the multimodal masked autoencoder, and a cost of obtaining the full-modality template image through optimization is very low.

A two-stage training method is adopted in this embodiment of this application, including a pretraining stage (the first stage) and a fine-tuning stage (the second stage). In the pretraining stage, a loss function is $\mathcal{L}_{mse}$, an optimization target (the first constraint condition in the above) in the pretraining stage may be summarized as the following formula (3):

$$\min_{F, x^{sub}} \mathcal{L}_{mse}\left(x, F\left(S\left(x_i, x^{sub}\right)\right)\right) + \gamma \mathcal{R}\left(x^{sub}\right) \quad (3)$$

corresponding to formula (1), the pretraining stage can enable the multimodal masked autoencoder to learn the relationship between modalities in the data and anatomize integrity without any annotation, to perform modal completion, and obtain the optimization result of $x^{sub}$, the full-modality template image $\hat{x}^{sub}$.

Refer to FIG. 8. Operation 803. Perform self-distillation on a pretrained image processing model based on training samples of different modalities.

For example, in a self-distillation process, a teacher model and a student model are a same model, namely, a model guides itself to learn, to complete knowledge distillation. In this embodiment of this application, a computationally high-efficiency self-distillation manner is designed based on a multimodal masked autoencoder pretraining frame, which can perform mutual distillation on task-related knowledge in a combination of two training sample images in different missing-modality situations in a same model.

For example, in each training batch, in this embodiment of this application, a plurality of samples in different missing-modality situations are obtained by randomly sampling based on a same full-modality sample, the full-modality sample and a plurality of samples in different missing-modality situations form a sample set, two different modality situations (including the full-modality situation and multiple missing-modality situations) are randomly obtained from the sample set, the multimodal masked autoencoder is invoked to respectively performing reconstruction, and a feature map (which may be indicated as a matrix formed by pixel value vectors) of a completed modality corresponding to each sample can be obtained in a reconstruction process. A consistency loss is used in the self-distillation process, to improve semantic consistency (the second constraint condition) of a combination of sample images of two missing modalities in a latent space. This may be indicated as the following formula (2):

$$\mathcal{L}_{con}(x_0, x_1, \hat{x}^{sub}) = \mathcal{L}_{mse}(f_0, f_1) \tag{2}$$

$x_0$ and $x_1$ are respectively two different missing-modality situations of the multimodal image x. $f_0$, $f_1 \in \mathbb{R}^{C \times D' \times H' \times W'}$ are feature maps in latent spaces corresponding to $S(x_0, \hat{x}^{sub})$ and $S(x_1, \hat{x}^{sub})$ and C, D', H', W' are respectively a number of channels, a depth, a height, and a width of the feature map. Formula (2) means obtaining a mean square error $\mathcal{L}_{mse}$ between the feature maps in the latent spaces respectively corresponding to $S(x_0, \hat{x}^{sub})$ and $S(x_1, \hat{x}^{sub})$ and obtaining a consistency loss $\mathcal{L}_{con}$ between $S(x_0, \hat{x}^{sub})$ and $S(x_1, \hat{x}^{sub})$ In a self-distillation process, using that the consistency loss $\mathcal{L}$con is equal to the mean square error $\mathcal{L}_{mse}$ as an objective, the parameter of the multimodal masked autoencoder is adjusted.

In this embodiment of this application, distillation from a combination of more modalities to a combination of fewer modalities can promote the multimodal masked autoencoder to restore information of the missing modalities, and distillation from a combination of fewer modalities to a combination of more modalities can promote the model to learn modality-specific information.

Refer to FIG. 8. Operation 804. Fine-tune the trained image processing model.

For example, in the fine-tuning stage, during training, to simulate an actual modality missing scenario, zero to three modalities are randomly removed, and are replaced with corresponding modalities in the full-modality template image $\hat{x}^{sub}$. Referring to FIG. 6, the regression network 602 used in the pretraining stage is replaced with a randomly initialized segmentation network $f_s$(segmentation head), and a weight of another part of the model is initialized by using a weight pretrained in the first stage. An optimization target (the third constraint condition) of the second stage is indicated as following formula (4):

$$\min_{f, f_s} \sum_{i=0}^{1} \mathcal{L}_{seg}(s^{gt}, x_i, \hat{x}^{sub}) + \lambda \mathcal{L}_{con}(x_0, x_1, \hat{x}^{sub}) \tag{4}$$

$\mathcal{L}_{seg}$ is a segmentation loss, $s^{gt}$ is a segmentation annotation (annotating an actual segmentation region), and λ is a loss weight. λ is set to 0.1 in this embodiment of this application. In this embodiment of this application, a deeply supervised policy is used for training a multimodal segmentation network (the image processing model). Referring to FIG. 6, the multimodal masked autoencoder includes the encoder and the decoder. The encoder and the decoder respectively include a plurality of neural network blocks. In the decoder, first two neural network blocks (corresponding sampling ratios are 1/2 and 1/4, represented as α), and corresponding losses are added to the segmentation loss $\mathcal{L}$eg. Specifically, a 1×1×1 convolutional layer with a trilinear interpolation upsampling layer are used in this embodiment of this application for obtaining a segmentation output corresponding to a network block. Subsequently, a total segmentation loss may be represented as:

$$\mathcal{L}_{seg}(s^{gt}, x_i, \hat{x}^{sub}) = \sum_{\alpha \in \{1, \frac{1}{2}, \frac{1}{4}\}} \mathcal{L}(s^{gt}, \hat{s}_i^{\alpha}), \; i \in \{0, 1\} \tag{5}$$

$\mathcal{L}$ is a sum of a widely used Dice loss and a cross-entropy loss, $$\hat{s}_i^{\alpha}$$

is a segmentation result (including a final output of the network, namely, a segmentation region obtained by completing an image with a missing part and segmenting the completed image) outputted by the neural network blocks corresponding to the sampling ratio α. In the second stage, a network (formed by the multimodal masked autoencoder and the segmentation network) is fine-tuned to a multimodal segmentation network that can process missing modalities simultaneously.

This embodiment of this application is completed on a PyTorch (1.7.1) neural network. A network structure of the image processing model in this embodiment of this application is a three-dimensional U-shaped network, whose encoder and decoder are formed by network blocks with a residual structure. In this embodiment of this application, an Adam algorithm is used as an optimizer during network training, and numbers of training rounds in the first stage and the second stage are respectively 600 and 300. An initial learning rate of training is 3e-4, and a cosine annealing learning rate scheduling mechanism is used during the training (the learning rate is updated according to the decay cycle of the cosine waveform, the first half cycle is reduced from a maximum value to a minimum value, and the second half cycle is increased from the minimum value to the maximum value).

A hardware environment of training the model in this embodiment of this application is described below. The image processing model may be trained on two 2080Ti Nvidia graphics cards, and a size of batch processing is 2. To standardize all data, in this embodiment of this application, the pixel values of these images are cropped to one to ninety-nine percent of an intensity value, then is min-max scaled to a range [0, 1], and is finally randomly cropped to a fixed size of 128×128×128 voxels for training. A side length of a random three-dimensional block is set to 16 pixels. $x^{sub}$ is initialized by Gaussian noise, and λ is set to 0.1. In this embodiment of this application, commonly used data enhancement is used for increasing diversity of training data, including random signal value scaling and adjustment, and random flipping along three dimensions.

Refer to FIG. 8. Operation 805. Invoke, based on a to-be-processed MRI image, the image processing model on which training is completed to perform image segmentation processing.

Figure 7A:
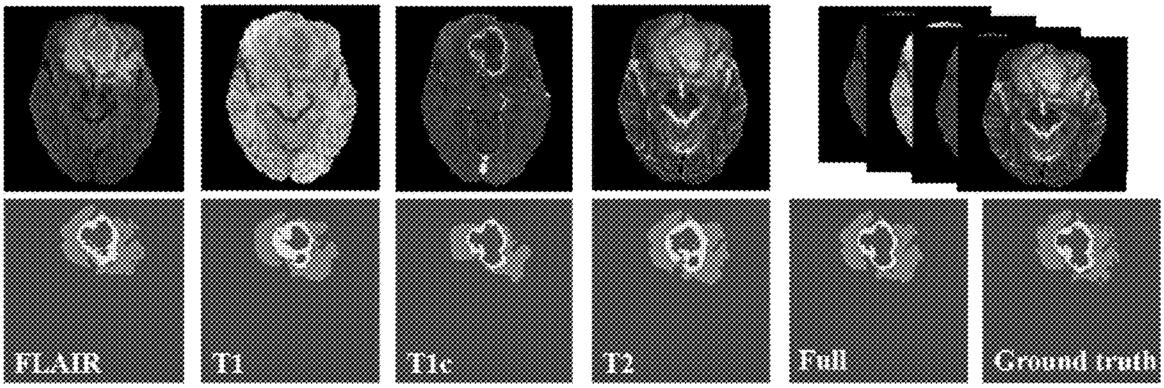
FIG. 7A is a schematic diagram showing segmentation results according to an embodiment of this application.

For example, the image processing model is invoked based on data of missing modalities. The image processing model includes: the multimodal masked autoencoder and the segmentation network. The multimodal masked autoencoder obtains a serial number of the missing modality and a position of a missing block in the data of missing modalities, and a modality and a block corresponding to the full-modality template image $x^{sub}$ obtained through optimization in the training stage are used to fill the data of missing modalities, to obtain a completed multimodal image. The segmentation network in the image processing model segments an image of each modality in the completed multimodal image, to obtain an abnormal region (a tumor region). FIG. 7A is a schematic diagram showing segmentation results according to an embodiment of this application. Images on the upper row are original images corresponding to various modalities (including: FLAIR, T1, T1c, and T2) and the full-modality image, and images on the lower row segmentation results corresponding to the various modalities, a segmentation result corresponding to the full-modality image, and an actual segmentation result (a ground truth).

Figure 5A:
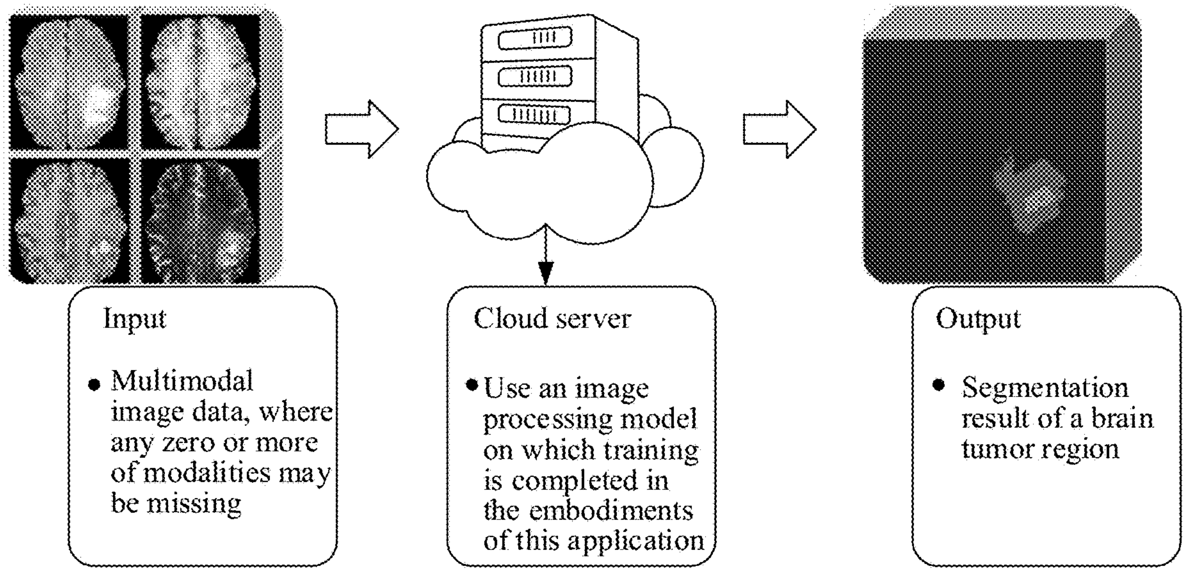
FIG. 5A is a schematic flowchart of image processing according to an embodiment of this application.

FIG. 5A is a schematic flowchart of image processing according to an embodiment of this application. The image processing model on which training is completed in this embodiment of this application may be stored in a cloud server, and multimodal image data is inputted into the cloud server. Any zero or more of modalities in the multimodal image data may be missing. The cloud server performs segmentation processing on the multimodal image data based on the image processing model, and outputs a segmentation result of a brain tumor region. FIG. 4C is a schematic diagram showing a segmentation region according to an embodiment of this application. FIG. 4C shows a segmentation result of a brain tumor region. An image GT is a modality in a brain MRI image obtained by completion of modalities. A segmentation region 401C is an abnormal region obtained by segmenting the image GT. Different display manners (for example, different colors or different gray scales) in the abnormal region indicate different lesions (for example, edema, necrosis, an enhancing tumor, or a non-enhancing tumor core).

Figure 5B:
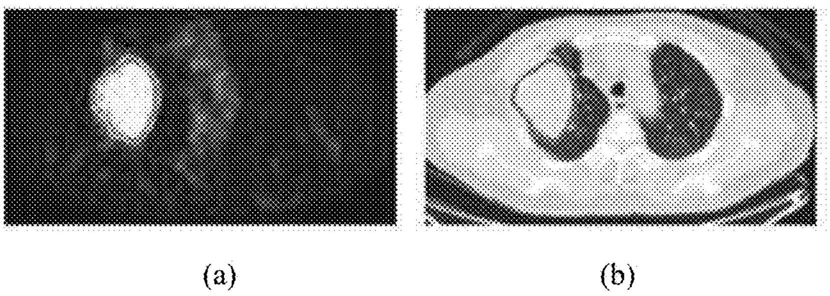
FIG. 5B is a schematic diagram showing segmentation results according to an embodiment of this application.

An application scenario of this embodiment of this application may be a combination of other types of multimodal medical image data and other body parts (such as a lung tumor). FIG. 5B is a schematic diagram showing segmentation results according to an embodiment of this application. FIG. (a) in FIG. 5B shows a segmentation result obtained by segmenting a lung image acquired for positron emission tomography (PET) in this embodiment of this application. FIG. (b) shows a segmentation result obtained by segmenting a lung image acquired for computed tomography (CT) in this embodiment of this application.

The embodiments of this application have the following beneficial effects:

(1) In the embodiments of this application, knowledge distillation can be performed between multiple missing-modality combinations without co-training, and only one model needs to be trained to handle all missing-modality situations. This simplifies a training process, reduces a calculation amount and display memory consumption of the entire training and memory consumption of deployment. In addition, in the embodiments of this application, relationships between multiple missing-modality combinations can be implicitly modeled. Compared with a frame of co-training, the embodiments of this application can achieve a better effect in data of missing modalities compared with an existing optimal method.

(2) The self-distillation policy combined with the multimodal masked autoencoder provided in the embodiments of this application can also achieve a better effect in data of full modalities. Experimental results on the BraTS 2018 official online verification dataset represent that segmentation results of the self-distillation policy combined with the multimodal masked autoencoder in full-modality situations is better than an existing optimal brain MRI tumor segmentation method in missing-modality situations.

The embodiments of this application are experimentally verified to be effective in the brain tumor segmentation competition BraTS 2018. The dataset of the BraTS series includes multi-contrast MRI images of four modalities, namely, T1, T1c, T2, and FLAIR. The data is organized by the competition, and pre-processing are performed, including peeling off the skull, resampling to a unified resolution (1 $m^3$), and co-registering on the same template. In this competition, four intratumoral structures (an edema, an enhancing tumor, necrosis, and a non-enhancing tumor core) are divided into three tumor regions and are used as segmentation targets of the competition: 1. a whole tumor (WT), including all tumor regions; 2. a tumor core (TC), including the enhancing tumor, the necrosis, and the non-enhancing tumor core; and 3. enhancing tumor (ET).

The BraTS 2018 dataset separately includes 285 cases of data and corresponding tumor region annotation. In this embodiment of this application, the training set is divided into a training set (199 cases), a verification set (29 cases), and a testing set (57 cases), and the Dice coefficient (DSC %) and 95% Hausdorff distance (HD95) as evaluation indicators. In addition, in this embodiment of this application, an online evaluation system (https://ipp.cbica.upenn.edu/) is further used to verify performance of the technology of the embodiments of this application in the official verification set in full-modality situations.

FIG. 7C shows a comparison result table according to an embodiment of this application, including comparison results (DSC %, mean±std) between the solution in the embodiments of this application on the BraTS 2018 dataset and the existing optimal method. Existing modalities and missing modalities are respectively represented by • and ○, * represents that a p value obtained through a Wilcoxon signed rank test and compared with the result of the method in the embodiments of this application is less than 0.05.

The comparison result table in FIG. 7C shows comparison between the method in the embodiments of this application and four existing optimal brain MRI tumor segmentation methods in the absence of modality on the BraTS 2018 dataset. It can be found in the comparison result table in FIG. 7C that the method provided in the embodiments of this application has the best overall performance in the testing set, and achieves the best average in three tumor regions. Moreover, the embodiments of this application achieve the best result in most cases. The overall performance of the method in the embodiments of this application is better than two dedicated methods (ACN and SMU-Net). The two methods use a separate model to model each missing-modality situation, whose quantity of parameters is 15 times that of the method in the embodiments of this application. In the embodiments of this application, it is considered that this can be attributed to two reasons: 1. Each model of the dedicated method can only model a one-to-one relationship between two missing-modality situations. However, the mutual distillation method in the embodiments of this application can implicitly model relationships between all missing-modality situations. 2. Shields of modalities and blocks used in a model training process may be regarded as a type of data enhancement, which allows a network to be trained more fully.

In addition, the method provided in the embodiments of this application is better than the existing optimal solution RFNet, average indicators of the method in three tumor regions exceed the RFNet. The method in the embodiments of this application adopts a common encoder-decoder structure. Both the quantity of parameters and the complexity of the method in the embodiments of this application are better than those of the RFNet. In conclusion, the method provided in the embodiments of this application achieves an optimal effect in the tumor segmentation task of the multimodal brain MRI image in the missing-modality situations, and uses a more efficient and economical architecture.

FIG. 7D shows a comparison result table according to an embodiment of this application, including comparison results (mean±std) between the solution in the embodiments of this application on the BraTS 2018 dataset and the existing optimal method under a full-modality condition. Challenge represents a winning solution of the corresponding competition. NA: unable to obtain. * represents that a p value obtained through a Wilcoxon signed rank test and compared with the result of the method in the embodiments of this application is less than 0.05. †: reproduced using code of the original author. ‡: provided by the original author. In the comparison result table in FIG. 7D, in addition to four comparison solutions in the above example, two self-supervision methods are also included in the comparison: a general self-supervision method (ModGen) used for medical image analysis; and a self-supervision method (CMJP) used for multimodal medical image data. The results show that the embodiments of this application achieve the best results in a total of six situations under two indicators. In addition, results of winning solutions of the corresponding competition are also included in the table as a reference (Challenge). The results of the embodiments of this application are equivalent to the results of the winning solutions in most situations, and in some situations, even exceed the winning solutions of the competition. Heavy engineering adjustment is performed on the competition solutions for multi-modal segmentation. The results represent that the multimodal representation learned by a frame of the embodiments of this application is robust to the missing modalities, and can also achieve good effects in full-modality situations.

Figure 7B:
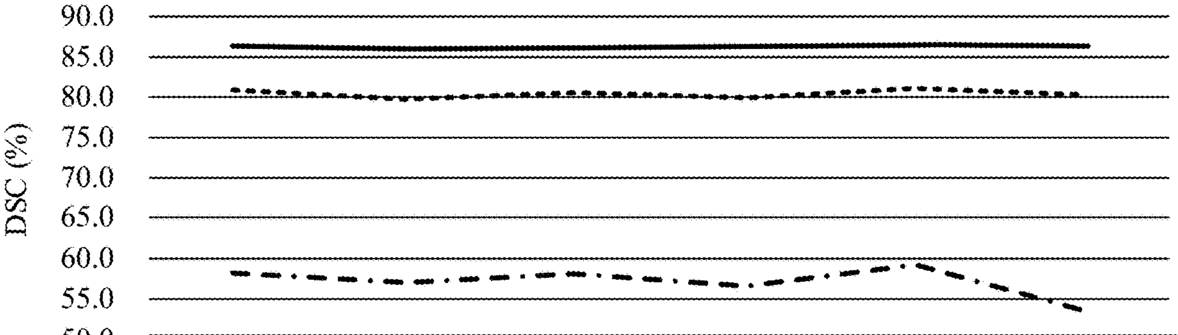
FIG. 7B shows an analysis table of a consistency loss according to an embodiment of this application.

To verify effectiveness of the self-distillation applied in the embodiments of this application, results of adding the consistency loss to different positions (including each layer and output of the encoder) in the network and not adding the consistency loss in this embodiment of this application. For experiment results, FIG. 7B shows an analysis table of a consistency loss according to an embodiment of this application. The following conclusions can be drawn.

(1) Outputs of adding the consistency loss to first three network blocks (feature-1, feature-2, and feature-3) are compared to that of not adding the consistency loss, and the results are reduced. Because features of shallow layers more tend to be affected by differences between data of different modality combinations, forcibly adding the consistency loss affects feature extraction of the model, causing the effect to decrease.

(2) Adding the consistency loss to the deepest layer of a network encoder (feature-4) improves the effect of the network. Because the deepest layer emphasizes a semantic structure of the image, and is not easy to be affected by differences between different modality combinations.

(3) The result of directly adding the consistency loss to the output corresponding to different modal combinations (output) is significantly reduced. Because in a self-distillation scenario, directly adding the consistency loss to the output tends to cause modality combinations including more modalities to be affected by modality combinations including fewer modalities with a poorer effect, so that an overall effect is poor.

An exemplary structure of the training apparatus 455 for an image processing model provided in the embodiments of this application implemented as a software module is still described below. In some embodiments, as shown in FIG. 2A, a software module in the training apparatus 455 for an image processing model stored in the memory 450 may include: the sample obtaining module 4551, configured to obtain a plurality of multimodal images used as training samples, types of the multimodal images including full-modality images and missing-modality images; the pretraining module 4552, configured to invoke, based on each of the multimodal images, an initialized image processing model to execute a first training task for reconstructing the full-modality image, the image processing model outputting a first full-modality reconstructed image corresponding to each of the multimodal images in a process of executing the first training task, the pretraining module 4552 being further configured to perform image completion processing on each of first full-modality reconstructed images based on the full-modality image, to obtain a full-modality template image; and the model adjustment module 4553, configured to determine a consistency loss between a multimodal image pair and the full-modality template image, the multimodal image pair includes any two multimodal images, the model adjustment module 4553 being further configured to invoke, based on each multimodal image, a trained image processing model to execute a second training task for segmenting each of the multimodal images, and use the consistency loss as a constraint condition of updating the parameter of the image processing model in the second training task.

In some embodiments, the pretraining module 4552 is configured to invoke, based on each of the multimodal images, the initialized image processing model to perform reconstruction processing, to obtain the first full-modality reconstructed image corresponding to each of the multimodal images; determine a first mean square error loss based on each of the first full-modality reconstructed images and the full-modality image; and perform backpropagation processing on the initialized image processing model based on the first mean square error loss, to obtain the trained image processing model.

In some embodiments, the pretraining module 4552 is configured to invoke, based on each of the multimodal images, the initialized image processing model, to perform the following processing: performing encoding processing on the multimodal image, to obtain a first encoding vector of the multimodal image, the first encoding vector being an encoding vector of a non-missing part in the multimodal image; performing missing part prediction processing based on the first encoding vector, to obtain a first prediction vector of the missing part in the multimodal image; and performing integration processing on the first prediction vector and the first encoding vector, to obtain the first full-modality reconstructed image.

In some embodiments, the initialized image processing model includes: a multimodal masked autoencoder and a regression network, the multimodal masked autoencoder including: an encoder layer and a decoder layer. The encoder layer is configured to perform the encoding processing; the decoder layer is configured to perform the missing part prediction process; and the regression network is configured to perform the integration processing.

In some embodiments, the pretraining module 4552 is configured to substitute the first full-modality reconstructed image into a regular function, to obtain a first regularization term, and use that a sum of the first mean square error loss and the first regularization term is minimum as a first constraint condition; and update a parameter of the initialized image processing model based on the first constraint condition and the first mean square error loss, to obtain the trained image processing model.

In some embodiments, the pretraining module 4552 is configured to perform the following processing on each of the multimodal images: determining a missing part of the multimodal image, and performing completion processing on the missing part based on the first full-modality reconstructed image, to obtain a first completed image; performing linear regression processing on the first completed image, to obtain a linear regression result, and obtaining the first mean square error loss between the linear regression result and the full-modality image; Obtaining, from the first full-modality reconstructed images, a target full-modality reconstructed image minimizing the first mean square error loss, and substituting the target full-modality reconstructed image into a regular function, to obtain a first regularization term; and using a sum of the first regularization term and the target full-modality reconstructed image as the full-modality template image.

In some embodiments, the model adjustment module 4553 is configured to perform the following processing on each of the multimodal images in the multimodal image pair: determining a missing part of the multimodal image, and performing completion processing on the missing part based on the full-modality template image, to obtain a second completed image; and determining a second mean square error loss between two second completed images in the multimodal image pair, and using the second mean square error loss as the consistency loss, the two second completed images in the multimodal image pair including: a second completed image of the first multimodal image in the multimodal image pair and a second completed image of the second multimodal image in the multimodal image pair.

In some embodiments, the model adjustment module 4553 is configured to invoke, based on each of the multimodal images, the trained image processing model to perform image segmentation processing, to obtain a predicted segmentation result corresponding to each of the multimodal images; determine a segmentation loss of the image processing model based on the predicted segmentation result and an actual segmentation result; and perform backpropagation processing on the image processing model based on the consistency loss and the segmentation loss, to obtain a retrained image processing model, the retrained image processing model being configured to segment a multimodal image with a missing modality.

In some embodiments, the model adjustment module 4553 is configured to invoke, based on each of the multimodal images, the trained image processing model, to perform the following processing: performing encoding processing on the multimodal image, to obtain a second encoding vector of the multimodal image, the second encoding vector being an encoding vector of a non-missing part in the multimodal image; obtaining a missing part in the multimodal image, and extracting a third encoding vector corresponding to the missing part from the full-modality template image; performing missing part prediction processing based on the third encoding vector and the second encoding vector, to obtain a second full-modality reconstructed image; and performing segmentation processing on the second full-modality reconstructed image, to obtain a predicted segmentation result corresponding to each of the multimodal images.

In some embodiments, the trained image processing model includes: a multimodal masked autoencoder and a segmentation network, the multimodal masked autoencoder including: an encoder layer and a decoder layer. The encoder layer is configured to perform the encoding processing, and obtain the third encoding vector; the decoder layer is configured to perform the missing part prediction process; and the segmentation network is configured to perform the segmentation processing.

In some embodiments, the model adjustment module 4553 is configured to extract a feature map of the second completed image from the second completed images respectively corresponding to the two multimodal images in the multimodal image pair; determine a third mean square error loss between feature maps of the two second completed images respectively corresponding to the two multimodal images, and use that the third mean square error loss is equal to the consistency loss as a second constraint condition; use that a sum of the consistency loss and the segmentation loss is minimum as a third constraint condition; and update a parameter of the image processing model based on the consistency loss and the segmentation loss, until the second constraint condition and the third constraint condition are met.

In some embodiments, the trained image processing model includes a multimodal masked autoencoder. The multimodal masked autoencoder includes: an encoder layer and a decoder layer. The decoder layer includes a multi-layered feature extraction layer. The feature map is obtained by invoking the feature extraction layer.

In some embodiments, the sample obtaining module 4551 is configured to obtain a full-modality image, the full-modality image including subimages of multiple modalities; and perform a plurality of times of different mask processing on image blocks in the subimages of the full-modality image, to obtain a plurality of different missing-modality images, and use the plurality of missing-modality images and the full-modality image as the training samples.

In some embodiments, the initialized image processing model includes: a multimodal masked autoencoder. The multimodal masked autoencoder is configured to perform mask processing on the full-modality image.

An embodiment of this application further provides an image processing apparatus. An exemplary structure of the image processing apparatus 456 provided in the embodiments of this application implemented as a software module is still described below. In some embodiments, as shown in FIG. 2B, a software module in the image processing apparatus 456 stored in the memory 450 may include: the image receiving module 4554, configured to receive a to-be-processed multimodal image; and the image processing module 4555, configured to invoke, based on the multimodal image, an image processing model to perform image segmentation processing, to obtain a segmentation result corresponding to the multimodal image, the image processing model being obtained by training based on the training method for an image processing model provided in the embodiments of this application.

In some embodiments, the image processing module 4555 is configured to invoke, based on each of the multimodal images, the initialized image processing model, to perform the following processing: performing encoding processing on the multimodal image, to obtain a fourth encoding vector of the multimodal image, the fourth encoding vector being an encoding vector of a non-missing part in the multimodal image; obtaining a missing part in the multimodal image, and extracting a fifth encoding vector corresponding to the missing part from the full-modality template image; performing missing part prediction processing based on the fourth encoding vector and the fifth encoding vector, to obtain a third full-modality reconstructed image; and performing segmentation processing on the third full-modality reconstructed image, to obtain a predicted segmentation result corresponding to the multimodal image.

In some embodiments, the image processing model includes: a multimodal masked autoencoder and a segmentation network, the multimodal masked autoencoder including: an encoder layer and a decoder layer. The encoder layer is configured to perform the encoding processing, and obtain the fifth encoding vector; the decoder layer is configured to perform the missing part prediction process; and the segmentation network is configured to perform the segmentation processing.

An embodiment of this application provides a computer program product. The computer program product includes a computer program or computer-executable instructions, and the computer program or the computer-executable instructions are stored in a computer-readable storage medium. A processor of a computer device reads the computer-executable instructions from the computer-readable storage medium, and the processor executes the computer-executable instructions, to cause the computer device to perform the training method for an image processing model described in the embodiments of this application, or the image processing method described in the embodiments of this application.

An embodiment of this application provides a computer-readable storage medium having computer-executable instructions stored therein. The computer-executable instructions, when executed by a processor, cause the processor to perform the training method for an image processing model provided in the embodiments of this application, for example, the training method for an image processing model shown in FIG. 3A, or cause the processor to perform the image processing method provided in the embodiments of this application, for example, the image processing method shown in FIG. 3A.

In some embodiments, the computer-readable storage medium may be a memory such as an FRAM, a ROM, a PROM, an EPROM, an EEPROM, a flash memory, a magnetic surface memory, an optical disk, or a CD-ROM, or may be any device including one of or any combination of the foregoing memories.

In some embodiments, the computer-executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the computer-executable instructions may, but do not necessarily, correspond to a file in a file system, and may be stored in a part of a file that stores another program or other data, for example, be stored in one or more scripts in a Hypertext Markup Language (HTML) file, stored in a file that is specially used for a program in discussion, or stored in a plurality of collaborative files (for example, be stored in files of one or more modules, subprograms, or code parts).

In an example, the computer-executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

In conclusion, through staged training for the image processing model in the embodiments of this application, the image processing model has a function of reconstructing a missing part in multimodal images, and a function of accurately segmenting a specific region in multimodal images. The consistency loss is used as the constraint condition, so that when processing multimodal images with different missing modalities, the image processing model can keep consistency between segmentation results, which improves the accuracy of segmentation of multimodal images.

The above are merely embodiments of this application and are not intended to limit the protection scope of this application. Any modification, equivalent replacement, or improvement made without departing from the spirit and range of this application shall fall within the protection scope of this application.

What is claimed is:

1. A training method, performed by an electronic device, comprising:

obtaining a plurality of multimodal images, the multimodal images including a full-modality image and a missing-modality image, and each of the multimodal images including a plurality of images of different modalities;

invoking, based on each of the multimodal images, an initialized image processing model to execute a first training task for reconstructing the full-modality image, in a process of executing the first training task, the image processing model outputting a plurality of full-modality reconstructed images each corresponding to one of the multimodal images;

performing image completion processing on each of the full-modality reconstructed images based on the full-modality image, to obtain a full-modality template image;

determining a consistency loss between a multimodal image pair and the full-modality template image, the multimodal image pair including any two of the multimodal images; and invoking, based on each of the multimodal images, a trained image processing model to execute a second training task for segmenting each of the multimodal images, the consistency loss being used as a constraint condition of updating a parameter of the image processing model in the second training task.

2. The method according to claim 1, wherein invoking the initialized image processing model to execute the first training task includes:

invoking, based on each of the multimodal images, the initialized image processing model to perform reconstruction processing, to obtain the full-modality reconstructed images;

determining a mean square error loss based on each of the full-modality reconstructed images and the full-modality image; and performing backpropagation processing on the initialized image processing model based on the mean square error loss, to obtain the trained image processing model.

3. The method according to claim 2, wherein invoking the initialized image processing model to perform reconstruction processing, to obtain the full-modality reconstructed images includes, for each multimodal image of the plurality of multimodal images:

invoking, based on the multimodal image, the initialized image processing model to:

perform encoding processing on the multimodal image, to obtain an encoding vector of a non-missing part in the multimodal image;

perform missing part prediction processing based on the encoding vector, to obtain a prediction vector of a missing part in the multimodal image; and perform integration processing on the prediction vector and the encoding vector, to obtain the full-modality reconstructed image corresponding to the multimodal image.

4. The method according to claim 3, wherein the initialized image processing model includes:

a multimodal masked autoencoder including:

an encoder layer configured to perform the encoding processing; and a decoder layer configured to perform the missing part prediction processing; and a regression network configured to perform the integration processing.

5. The method according to claim 2, wherein performing backpropagation processing on the initialized image processing model to obtain the trained image processing model includes:

substituting the full-modality reconstructed images into a regular function, to obtain a regularization term; and updating a parameter of the initialized image processing model based on the mean square error loss and a constraint condition that a sum of the mean square error loss and the regularization term is minimum, to obtain the trained image processing model.

6. The method according to claim 1, wherein performing image completion processing on each of the full-modality reconstructed images based on the full-modality image, to obtain the full-modality template image includes, for each multimodal image of the multimodal images:

determining a missing part in the multimodal image;

performing completion processing on the missing part based on the full-modality reconstructed image, to obtain a completed image;

performing linear regression processing on the completed image, to obtain a linear regression result;

obtaining a mean square error loss between the linear regression result and the full-modality image;

obtaining, from the full-modality reconstructed images, a target full-modality reconstructed image that minimizes the mean square error loss;

substituting the target full-modality reconstructed image into a regular function, to obtain a regularization term; and adding the regularization term to the target full-modality reconstructed image to obtain the full-modality template image.

7. The method according to claim 1, wherein determining the consistency loss includes:

for each multimodal image of the multimodal images in the multimodal image pair:

determining a missing part of the multimodal image; and performing completion processing on the missing part based on the full-modality template image, to obtain a completed image; and determining a mean square error loss between the two completed images of the two multimodal images in the multimodal image pair as the consistency loss.

8. The method according to claim 7, wherein invoking the trained image processing model to execute the second training task includes:

for each multimodal image of the plurality of multimodal images, invoking, based on the multimodal image, the trained image processing model to perform image segmentation processing, to obtain a predicted segmentation result corresponding to the multimodal image;

determining a segmentation loss of the image processing model based on the predicted segmentation results of the multimodal images and an actual segmentation result; and performing backpropagation processing on the image processing model based on the consistency loss and the segmentation loss, to obtain a retrained image processing model.

9. The method according to claim 8, wherein:

the full-modality reconstructed images are first full-modality reconstructed images; and invoking, based on the multimodal image, the trained image processing model to perform image segmentation processing, to obtain the predicted segmentation result corresponding to the multimodal image includes invoking, based on the multimodal image, the trained image processing model, to:

perform encoding processing on the multimodal image, to obtain a first encoding vector of a non-missing part in the multimodal image;

obtain a missing part in the multimodal image;

extract a second encoding vector corresponding to the missing part from the full-modality template image;

perform missing part prediction processing based on the second encoding vector and the first encoding vector, to obtain a second full-modality reconstructed image; and perform segmentation processing on the second full-modality reconstructed image, to obtain a predicted segmentation result corresponding to the multimodal image.

10. The method according to claim 9, wherein the trained image processing model includes:

a multimodal masked autoencoder including:

an encoder layer configured to perform the encoding processing and to obtain the second encoding vector; and a decoder layer configured to perform the missing part prediction processing; and a segmentation network configured to perform the segmentation processing.

11. The method according to claim 8, wherein:

the mean square error loss is a first mean square error loss; and performing backpropagation processing on the image processing model based on the consistency loss and the segmentation loss includes:

for each completed image of the two completed images, extracting, from the completed image, a feature map of the completed image;

determining a second mean square error loss between the feature maps of the two completed images respectively corresponding to the two multimodal images; and updating a parameter of the image processing model based on the consistency loss and the segmentation loss, until a first constraint condition and a second constraint condition are met, the first constraint condition being that the second mean square error loss is equal to the consistency loss, and the second constraint condition being that a sum of the consistency loss and the segmentation loss is minimum.

12. The method according to claim 1, wherein:

the missing-modality image is one of a plurality of different missing-modality images; and obtaining the plurality of multimodal images includes:

obtaining the full-modality image, the full-modality image including subimages of multiple modalities; and performing a plurality of times of different mask processing on image blocks in the subimages, to obtain the plurality of different missing-modality images.

13. An image processing method, performed by an electronic device, comprising:

receiving a target multimodal image; and invoking, based on the target multimodal image, an image processing model to perform image segmentation processing, to obtain a segmentation result corresponding to the target multimodal image, the image processing model being obtained by training based on the training method according to claim 1.

14. The method according to claim 13, wherein:

the full-modality reconstructed images are first full-modality reconstructed images; and invoking, based on the target multimodal image, the image processing model to perform image segmentation processing includes invoking, based on the target multimodal image, the image processing model to:

perform encoding processing on the target multimodal image, to obtain a first encoding vector of a non-missing part in the target multimodal image;

obtain a missing part in the multimodal image;

extract a second encoding vector corresponding to the missing part from the full-modality template image;

perform missing part prediction processing based on the first encoding vector and the second encoding vector, to obtain a second full-modality reconstructed image; and perform segmentation processing on the second full-modality reconstructed image, to obtain a predicted segmentation result corresponding to the target multimodal image.

15. The method according to claim 14, wherein the image processing model includes:

a multimodal masked autoencoder including:

an encoder layer configured to perform the encoding processing, and to obtain the second encoding vector; and a decoder layer configured to perform the missing part prediction processing; and a segmentation network configured to perform the segmentation processing.

16. An electronic device comprising:

one or more memories storing one or more computer-executable instructions; and one or more processors configured to execute the one or more computer-executable instructions to implement the method according to claim 13.

17. A non-transitory computer-readable storage medium storing one or more computer-executable instructions that, when executed by one or more processors, cause the one or more processors to implement the method according to claim 13.

18. An electronic device comprising:

one or more memories storing one or more computer-executable instructions; and one or more processors configured to execute the one or more computer-executable instructions to:

obtain a plurality of multimodal images, the multimodal images including a full-modality image and a missing-modality image, and each of the multimodal images including a plurality of images of different modalities;

invoke, based on each of the multimodal images, an initialized image processing model to execute a first training task for reconstructing the full-modality image, in a process of executing the first training task, the image processing model outputting a plurality of full-modality reconstructed images each corresponding to one of the multimodal images;

perform image completion processing on each of the full-modality reconstructed images based on the full-modality image, to obtain a full-modality template image;

determine a consistency loss between a multimodal image pair and the full-modality template image, the multimodal image pair including any two of the multimodal images; and invoke, based on each of the multimodal images, a trained image processing model to execute a second training task for segmenting each of the multimodal images, the consistency loss being used as a constraint condition of updating a parameter of the image processing model in the second training task.

19. The electronic device according to claim 18, wherein the one or more processors are further configured to execute the one or more computer-executable instructions to:

invoke, based on each of the multimodal images, the initialized image processing model to perform reconstruction processing, to obtain the full-modality reconstructed images;

determine a mean square error loss based on each of the full-modality reconstructed images and the full-modality image; and perform backpropagation processing on the initialized image processing model based on the mean square error loss, to obtain the trained image processing model.

20. A non-transitory computer-readable storage medium storing one or more computer-executable instructions that, when executed by one or more processors, cause the one or more processors to:

obtain a plurality of multimodal images, the multimodal images including a full-modality image and a missing-modality image, and each of the multimodal images including a plurality of images of different modalities;

invoke, based on each of the multimodal images, an initialized image processing model to execute a first training task for reconstructing the full-modality image, in a process of executing the first training task, the image processing model outputting a plurality of full-modality reconstructed images each corresponding to one of the multimodal images;

perform image completion processing on each of the full-modality reconstructed images based on the full-modality image, to obtain a full-modality template image;

determine a consistency loss between a multimodal image pair and the full-modality template image, the multimodal image pair including any two of the multimodal images; and invoke, based on each of the multimodal images, a trained image processing model to execute a second training task for segmenting each of the multimodal images, the consistency loss being used as a constraint condition of updating a parameter of the image processing model in the second training task.

* * * * *